(12) United States Patent
Amaitis et al.

(10) Patent No.: US 7,962,400 B2
(45) Date of Patent: Jun. 14, 2011

(54) SYSTEM AND METHOD FOR WAGERING BASED ON THE MOVEMENT OF FINANCIAL MARKETS

(75) Inventors: Lee M. Amaitis, London (GB); Joseph M. Asher, New York, NY (US)

(73) Assignee: CFPH, LLC, New York, NY (US)

( * ) Notice: Subject to any disclaimer, the term of this patent is extended or adjusted under 35 U.S.C. 154(b) by 1461 days.

(21) Appl. No.: 10/836,999

(22) Filed: Apr. 29, 2004

(65) Prior Publication Data

US 2005/0027643 A1 Feb. 3, 2005

Related U.S. Application Data

(63) Continuation-in-part of application No. 10/654,280, filed on Sep. 3, 2003, now Pat. No. 7,233,922.

(60) Provisional application No. 60/459,692, filed on Apr. 2, 2003, provisional application No. 60/460,540, filed on Apr. 4, 2003, provisional application No. 60/460,537, filed on Apr. 4, 2003.

(51) Int. Cl.
*G06Q 40/00* (2006.01)
(52) U.S. Cl. ............. 705/37; 705/35; 705/36 R; 705/38
(58) Field of Classification Search ............... 705/35–38
See application file for complete search history.

(56) References Cited

U.S. PATENT DOCUMENTS

| | | | |
|---|---|---|---|
| 3,810,627 A | 5/1974 | Levy | |
| 4,569,526 A | 2/1986 | Hamilton | 273/242 |
| 4,666,160 A | 5/1987 | Hamilton | 273/242 |
| 4,695,053 A | 9/1987 | Vazquez, Jr. et al. | 273/143 R |
| 4,856,788 A | 8/1989 | Fischel | 273/256 |
| 4,874,177 A | 10/1989 | Girardin | |
| 4,875,164 A | 10/1989 | Monfort | |
| 4,962,950 A | 10/1990 | Champion | |
| 5,249,800 A | 10/1993 | Hilgendorf et al. | |
| 5,524,888 A | 6/1996 | Heidel | 463/22 |
| 5,573,244 A | 11/1996 | Mindes | |
| 5,575,474 A | 11/1996 | Rossides | |

(Continued)

FOREIGN PATENT DOCUMENTS

AU 2004227808 1/2004

(Continued)

OTHER PUBLICATIONS

Patent Pending Application entitled "System and Method for Wagering Based on Multiple Financial Market Indicators," Lee M. Amaitis et al., 30 pages, plus 4 pages of drawings.

(Continued)

*Primary Examiner* — Narayanswamy Subramanian
(74) *Attorney, Agent, or Firm* — Glen R. Farbanish

(57) ABSTRACT

A system for wagering comprises a memory and a processor. The memory stores a bet regarding a plurality of outcomes associated with financial market indicators. The bet comprises a first bet component indicating whether a value of a first financial market indicator will go up or go down in a first predetermined period of time, and a second bet component indicating whether a value of a second financial market indicator will go up or go down in a second predetermined period of time. The processor is coupled to the memory and is operable to determine an outcome of the first bet component, the second bet component, and the overall bet.

28 Claims, 3 Drawing Sheets

U.S. PATENT DOCUMENTS

| | | | | |
|---|---|---|---|---|
| 5,586,937 | A | 12/1996 | Menashe | |
| 5,588,650 | A | 12/1996 | Eman et al. | |
| 5,695,402 | A * | 12/1997 | Stupak | 463/20 |
| 5,713,793 | A | 2/1998 | Holte | |
| 5,743,525 | A | 4/1998 | Haddad | |
| 5,749,785 | A | 5/1998 | Rossides | 463/25 |
| 5,762,552 | A * | 6/1998 | Vuong et al. | 463/25 |
| 5,851,010 | A * | 12/1998 | Feinberg | 273/274 |
| 5,873,782 | A * | 2/1999 | Hall | 463/25 |
| 5,888,136 | A | 3/1999 | Herbert | |
| 6,024,641 | A * | 2/2000 | Sarno | 463/17 |
| 6,026,383 | A | 2/2000 | Ausubel | 705/37 |
| 6,038,554 | A | 3/2000 | Vig | 705/400 |
| 6,078,904 | A | 6/2000 | Rebane | |
| 6,110,042 | A | 8/2000 | Walker et al. | 463/25 |
| 6,113,492 | A | 9/2000 | Walker et al. | |
| 6,126,543 | A * | 10/2000 | Friedman | 463/16 |
| 6,152,822 | A | 11/2000 | Herbert | |
| 6,157,918 | A | 12/2000 | Shepherd | 705/37 |
| 6,296,569 | B1 | 10/2001 | Congello, Jr. | |
| 6,309,307 | B1 * | 10/2001 | Krause et al. | 473/274 |
| 6,321,212 | B1 * | 11/2001 | Lange | 705/36 R |
| 6,325,721 | B1 | 12/2001 | Miyamoto et al. | |
| 6,331,148 | B1 | 12/2001 | Krause et al. | |
| 6,343,988 | B1 | 2/2002 | Walker et al. | 463/21 |
| 6,358,150 | B1 | 3/2002 | Mir et al. | |
| 6,394,899 | B1 | 5/2002 | Walker | 463/9 |
| 6,421,653 | B1 | 7/2002 | May | 705/37 |
| 6,450,887 | B1 | 9/2002 | Mir et al. | |
| 6,527,270 | B2 * | 3/2003 | Maksymec et al. | 273/138.1 |
| 6,558,255 | B2 | 5/2003 | Walker et al. | 463/25 |
| 6,612,927 | B1 * | 9/2003 | Slomiany et al. | 463/16 |
| 6,616,529 | B1 | 9/2003 | Qian et al. | 463/1 |
| 6,709,330 | B1 | 3/2004 | Klein et al. | 463/9 |
| 6,869,360 | B2 | 3/2005 | Marks et al. | 463/25 |
| 6,890,255 | B2 * | 5/2005 | Jarvis et al. | 463/17 |
| 6,929,264 | B2 * | 8/2005 | Huard et al. | 273/274 |
| 6,938,900 | B2 * | 9/2005 | Snow | 273/292 |
| 7,018,293 | B2 * | 3/2006 | Brown et al. | 463/20 |
| 7,040,982 | B1 | 5/2006 | Jarvis et al. | 463/9 |
| 7,066,813 | B1 * | 6/2006 | Sakamoto et al. | 463/20 |
| 7,160,189 | B2 | 1/2007 | Walker et al. | 463/21 |
| 7,206,762 | B2 * | 4/2007 | Sireau | 705/37 |
| 7,233,922 | B2 * | 6/2007 | Asher et al. | 705/36 R |
| 7,236,953 | B1 | 6/2007 | Cooper et al. | |
| 7,246,093 | B1 | 7/2007 | Katz | |
| 7,299,208 | B1 | 11/2007 | Bailon et al. | |
| 7,302,412 | B1 * | 11/2007 | Speck | 705/37 |
| 7,315,838 | B2 | 1/2008 | Gershon | |
| 7,349,877 | B2 | 3/2008 | Ballow et al. | |
| 7,395,232 | B1 | 7/2008 | Pilato | |
| 7,401,046 | B2 | 7/2008 | Hollerman et al. | |
| 7,409,367 | B2 | 8/2008 | McGill et al. | |
| 7,496,534 | B2 | 2/2009 | Olsen et al. | |
| 7,559,838 | B2 * | 7/2009 | Walker et al. | 463/21 |
| 7,587,347 | B2 | 9/2009 | Griffin et al. | |
| 7,693,781 | B2 | 4/2010 | Asher et al. | |
| 7,711,628 | B2 | 5/2010 | Davie et al. | |
| 7,835,961 | B2 | 11/2010 | Davie et al. | |
| 2001/0032169 | A1 * | 10/2001 | Sireau | 705/37 |
| 2001/0039209 | A1 | 11/2001 | DeWeese et al. | |
| 2001/0047291 | A1 | 11/2001 | Garahi et al. | |
| 2002/0032644 | A1 | 3/2002 | Corby et al. | 705/37 |
| 2002/0055381 | A1 * | 5/2002 | Tarantino | 463/20 |
| 2002/0068633 | A1 * | 6/2002 | Schlaifer | 463/43 |
| 2002/0069161 | A1 | 6/2002 | Eckert et al. | |
| 2002/0072978 | A1 * | 6/2002 | Odom et al. | 705/26 |
| 2002/0073021 | A1 | 6/2002 | Ginsberg et al. | 705/38 |
| 2002/0077952 | A1 | 6/2002 | Eckert et al. | |
| 2002/0077961 | A1 | 6/2002 | Eckert et al. | |
| 2002/0087447 | A1 | 7/2002 | McDonald et al. | 705/36 |
| 2002/0090988 | A1 * | 7/2002 | Frost et al. | 463/17 |
| 2002/0098883 | A1 * | 7/2002 | Packes et al. | 463/20 |
| 2002/0115488 | A1 | 8/2002 | Berry et al. | |
| 2002/0147047 | A1 | 10/2002 | Letovsky et al. | 463/42 |
| 2002/0151358 | A1 * | 10/2002 | Walker et al. | 463/25 |
| 2002/0151363 | A1 | 10/2002 | Letovsky et al. | 463/40 |
| 2002/0198044 | A1 | 12/2002 | Walker et al. | 463/25 |
| 2003/0018571 | A1 | 1/2003 | Eckert et al. | |
| 2003/0046218 | A1 | 3/2003 | Albanese et al. | 705/37 |
| 2003/0054875 | A1 | 3/2003 | Marks et al. | 463/20 |
| 2003/0075869 | A1 * | 4/2003 | Breeding et al. | 273/292 |
| 2003/0096651 | A1 * | 5/2003 | Black | 463/42 |
| 2003/0109300 | A1 | 6/2003 | Walker et al. | 463/21 |
| 2003/0137110 | A1 * | 7/2003 | Huard et al. | 273/292 |
| 2003/0181234 | A1 * | 9/2003 | Falciglia, Sr. | 463/16 |
| 2003/0195841 | A1 | 10/2003 | Ginsberg et al. | 705/38 |
| 2003/0216170 | A1 | 11/2003 | Walker et al. | 463/25 |
| 2003/0218303 | A1 * | 11/2003 | Walker et al. | 273/292 |
| 2003/0220134 | A1 | 11/2003 | Walker et al. | 463/20 |
| 2004/0077398 | A1 * | 4/2004 | Jarvis et al. | 463/17 |
| 2004/0090005 | A1 * | 5/2004 | Snow | 273/292 |
| 2004/0111358 | A1 | 6/2004 | Lange et al. | |
| 2004/0166918 | A1 | 8/2004 | Walker et al. | 463/16 |
| 2004/0176159 | A1 | 9/2004 | Walker et al. | 463/20 |
| 2004/0176994 | A1 | 9/2004 | Fine et al. | 705/10 |
| 2004/0204229 | A1 | 10/2004 | Walker et al. | 463/20 |
| 2004/0204232 | A1 | 10/2004 | Asher et al. | 463/25 |
| 2004/0210507 | A1 | 10/2004 | Asher et al. | 705/37 |
| 2004/0214629 | A1 | 10/2004 | Walker et al. | 463/20 |
| 2004/0224770 | A1 | 11/2004 | Wolf et al. | 463/42 |
| 2005/0027643 | A1 | 2/2005 | Amaitis et al. | 705/37 |
| 2005/0043078 | A1 | 2/2005 | Sundstrom | 463/17 |
| 2005/0059467 | A1 | 3/2005 | Saffari et al. | 463/19 |
| 2005/0102223 | A1 | 5/2005 | Vlazny et al. | |
| 2005/0119962 | A1 | 6/2005 | Bowen et al. | 705/37 |
| 2005/0197938 | A1 | 9/2005 | Davie et al. | 705/35 |
| 2005/0197939 | A1 | 9/2005 | Davie et al. | 705/35 |
| 2005/0197948 | A1 | 9/2005 | Davie et al. | 705/37 |
| 2005/0208996 | A1 | 9/2005 | Friedman | 463/25 |
| 2005/0245308 | A1 | 11/2005 | Amaitis et al. | 463/20 |
| 2005/0245310 | A1 | 11/2005 | Amaitis et al. | 463/20 |
| 2006/0105839 | A1 | 5/2006 | Graeve et al. | 463/42 |
| 2006/0105840 | A1 | 5/2006 | Graeve | 463/42 |
| 2006/0199631 | A1 | 9/2006 | McGill et al. | |
| 2006/0287072 | A1 | 12/2006 | Walker et al. | |
| 2007/0083457 | A1 | 4/2007 | Evelyn et al. | |
| 2007/0111777 | A1 | 5/2007 | Amaitis et al. | 463/16 |
| 2007/0117624 | A1 | 5/2007 | Amaitis et al. | 463/30 |
| 2007/0123336 | A1 | 5/2007 | Amaitis et al. | 463/16 |
| 2007/0129138 | A1 | 6/2007 | Amaitis et al. | 463/25 |
| 2007/0207849 | A1 | 9/2007 | Asher et al. | |
| 2007/0208642 | A1 | 9/2007 | Asher et al. | |
| 2007/0288348 | A1 | 12/2007 | Sireau | |
| 2008/0032778 | A1 | 2/2008 | Amaitis et al. | 463/20 |
| 2008/0039189 | A1 | 2/2008 | Walker et al. | |
| 2008/0200242 | A1 | 8/2008 | Ginsberg et al. | |
| 2008/0275824 | A1 | 11/2008 | Assia et al. | |
| 2009/0062016 | A1 | 3/2009 | Assia et al. | |
| 2010/0009743 | A1 | 1/2010 | Amaitis et al. | |
| 2010/0173698 | A1 | 7/2010 | Davie et al. | |

FOREIGN PATENT DOCUMENTS

| | | |
|---|---|---|
| EP | 1 139 245 A1 | 3/2000 |
| EP | 1 234 606 A1 | 8/2002 |
| GB | 1 574 447 | 9/1980 |
| GB | 1574447 | 9/1980 |
| GB | 2 180 675 A | 4/1987 |
| GB | 2180675 A | 4/1987 |
| GB | 2 299 425 A | 10/1996 |
| GB | 2299425 A | 10/1996 |
| JP | 10-277269 | 10/1998 |
| JP | 11-073576 | 3/1999 |
| JP | 11-347200 | 12/1999 |
| JP | 2000-000372 | 1/2000 |
| JP | 2000-024324 | 1/2000 |
| JP | 2001-523869 | 11/2001 |
| JP | 2002-085851 | 3/2002 |
| JP | 2003-062336 | 3/2003 |
| WO | WO 98/04991 A1 | 2/1998 |
| WO | WO/99/26204 | 5/1999 |
| WO | WO 99/60498 | 11/1999 |
| WO | WO 00/79442 A1 | 12/2000 |
| WO | WO 01/77964 A2 | 10/2001 |
| WO | WO 01/86532 A1 | 11/2001 |

| WO | WO 2004/079671 A2 | 9/2004 |
| --- | --- | --- |
| WO | WO 2005/065065 A2 | 7/2005 |
| WO | WO 2005/065065 A3 | 7/2005 |

OTHER PUBLICATIONS

The Patent Office Search Report from International Application No. GB 0320232.2, 6 pages.

PCT Notification of Transmittal of The International Search Report and The Written Opinion of the International Searching Authority, or the Declaration for International Application No. PCT/US05/46927, 9 pages.

PCT Notification of Transmittal of the International Search Report and The Written Opinion of the International Searching Authority, or the Declaration for International Application No. PCT/US04/10028, 6 pages.

Ozgit, A.; *Performance Based Sports Derivatives: A New Instrument*; Chapter 3, pp. 83-121.

Sauer, Raymond D.; *The economics of Wagering Markets*; Journal of Economic Literature, vol. 36, No. 4; pp. 2021-2064.

Savage, Sam L.; *Prices, Probabilities and Predictions*; OR/MS Today, 10 pages.

Patent Pending U.S. Appl. No. 11/745,573 entitled *System and Method for Wagering-Based Transferable Financial Instruments* by Joseph M. Asher, et al.; 35 total pages.

Patent Pending U.S. Appl. No. 11/745,646 entitled *System and Method for Wagering-Based Transferable Financial Instruments* by Joseph M. Asher, et al.; 38 total pages.

USPTO *Office Action Summary* for U.S. Appl. No. 11/018,978, filed Dec. 21, 2004; 12 pages, Aug. 17, 2007.

*Notification of Transmittal of the International Search Report and the Written Opinion of the International Searching Authority* for International Application No. PCT/US05/15001; 10 pages, Sep. 13, 2007.

*United States Patent and Trademark Office; Office Action* for U.S. Appl. No. 11/745,573, filed May 8, 2007 in the name of Joseph M. Asher; 8 pages, Apr. 10, 2008.

*Random Walk Theory*; http://www.streetauthority.com/terms/r/random-walk-theory.asp; 3 pages, Unknown.

*Welcome to binarybet.com*; binarybet.com; 1 page, 2003.

*What is a Binary Bet?*; binarybet.com; 1 page, 2003.

*Frequently Asked Questions*; binarybet.com; 1 page, 2003.

*United States Patent and Trademark Office; Office Action* for U.S. Appl. No. 10/654,280, filed Sep. 3, 2003 in the name of Joseph M. Asher; 9 pages, Apr. 7, 2005.

*Fixed Odds Financial Betting*; http://web.archive.org/web/20020329110541/http://betonmarkets.com/; 2 pages, May 10, 2005.

*Notification of Transmittal of the International Search Report and the Written Opinion of the International Searching Authority* for International Application No. PCT/US2005/006853; 13 pages, May 10, 2005.

*United States Patent and Trademark Office; Office Action* for U.S. Appl. No. 10/836,077, filed Apr. 29, 2004 in the name of Lee M. Amaitis; 5 pages, Jun. 28, 2007.

*United States Patent and Trademark Office; Advisory Action* for U.S. Appl. No. 11/018,978, filed Dec. 21, 2004 in the name of Lee M. Amaitis; 3 pages, Jul. 12, 2007.

*United States Patent and Trademark Office; Office Action* for U.S. Appl. No. 10/794,666, filed Mar. 5, 2004 in the name of Christopher John Davie; 6 pages, Sep. 27, 2007.

*United States Patent and Trademark Office; Office Action* for U.S. Appl. No. 11/536,094, filed Sep. 28, 2006 in the name of Lee M. Amaitis; 24 pages, Oct. 25, 2007.

*United States Patent and Trademark Office; Office Action* for U.S. Appl. No. 11/535,662, filed Sep. 27, 2006 in the name of Lee M. Amaitis; 12 pages, Nov. 1, 2007.

Patent Pending U.S. Appl. No. 11/963,158 entitled *System and Method for Slot Machine Game Associated with Market Line Wagers* in the name of Lee M. Amaitis; filed Dec. 21, 2007.

Patent Pending U.S. Appl. No. 11/963,088 entitled *System and Method for Slot Machine Game Associated with Financial Market Indicators* in the name of Lee M. Amaitis, filed Dec. 21, 2007.

*United States Patent and Trademark Office; Office Action* for U.S. Appl. No. 10/795,163, filed Mar. 5, 2004 in the name of Christopher John Davie; 11 pages, Mar. 13, 2008.

*United States Patent and Trademark Office; Office* Action for U.S. Appl. No. 11/018,978, filed Dec. 21, 2004 in the name of Lee M. Amaitis; 6 pages, May 14, 2008.

*Australian Examiner's Report* for Application 2004227808; 2 pages, May 16, 2008.

*United States Patent and Trademark Office; Office Action* for U.S. Appl. No. 10/794,666, filed Mar. 5, 2004 in the name of Christopher John Davie; 11 pages, May 28, 2008.

*Notification of Transmittal of the International Search Report and the Written Opinion of the International Searching Authority* for International Application No. PCT/US05/15129; 8 pages, May 28, 2008.

*United States Patent and Trademark Office; Advisory Action* for U.S. Appl. No. 10/836,077, filed Apr. 29, 2004 in the name of Lee M. Amaitis; 2 pages, Jun. 3, 2008.

*United States Patent and Trademark Office; Office Action* for U.S. Appl. No. 10/654,280, filed Sep. 3, 2003 in the name of Joseph M. Asher; 17 pages, Jul. 13, 2005.

*United States Patent and Trademark Office; Office Action* for U.S. Appl. No. 10/654,280, filed Sep. 3, 2003 in the name of Joseph M. Asher; 11 pages, Jan. 12, 2006.

*United States Patent and Trademark Office; Office Action* for U.S. Appl. No. 11/018,978, filed Dec. 21, 2004 in the name of Lee M. Amaitis; 14 pages, May 18, 2006.

*United States Patent and Trademark Office; Notice of Allowance and Fee(s) Due* for U.S. Appl. No. 10/654,280, filed Sep. 3, 2003 in the name of Joseph M. Asher; 9 pages, Jan. 25, 2007.

*United States Patent and Trademark Office; Office Action* for U.S. Appl. No. 11/018,978, filed Dec. 21, 2004 in the name of Lee M. Amaitis; 15 pages, Apr. 25, 2007.

*United States Patent and Trademark Office; Office Action* for U.S. Appl. No. 10/836,077, filed Apr. 29, 2004 in the name of Lee M. Amaitis; 17 pages, Aug. 22, 2007.

Patent Pending U.S. Appl. No. 12/032,141 entitled *System and Method for Providing a Roulette Game Based on Multiple Financial Market Indicators* by Dean P. Alderucci, et al.; 38 total pages, filed Feb. 15, 2008.

Patent Pending U.S. Appl. No. 12/032,160 entitled *System and Method for Providing a Baccarat Game Based on Multiple Financial Market Indicators* by Dean P. Alderucci, et al.; 40 total pages, filed Feb. 15, 2008.

*United States Patent and Trademark Office; Office Action* for U.S. Appl. No. 10/836,077, filed Apr. 29, 2004 in the name of Lee M. Amaitis; 11 pages, Mar. 14, 2008.

NTRA All-Star Jockey Championship Special Wagers, 3 pages; date unknown.

"Wagering Information; Straight or Basic Wagers," Lone Star Park at Grand Prairie: Player's Guide, http://www.1onestarpark.com/bet_info.asp, 3 pages; date unknown.

"Wagering Information; Straight or Basic Wagers," NTRA.com, http://www.ntra.com/news.asp?type=playthehorses&id=4799, 3 pages; date unknown.

"Glossary of Terms," NTRA.com, http://www.ntra.com/news.asp?type=playthehorses&id=4797, 3 pages; date unknown.

"The Basics of Horseplay," NTRA.com, http://www.ntra.com/news.asp?type=playthehorses&id=4795, 2 pages; date unknown.

U.S. Appl. No. 10/654,280, filed Sep. 3, 2003, Asher et al.
U.S. Appl. No. 10/794,668, filed Mar. 5, 2004, Davie et al.
U.S. Appl. No. 10/794,666, filed Mar. 5, 2004, Davie et al.
U.S. Appl. No. 10/795,163, filed Mar. 5, 2004, Davie et al.
U.S. Appl. No. 11/467,047, filed Aug. 24, 2006, Amaitis et al.
U.S. Appl. No. 11/535,662, filed Sep. 27, 2006, Amaitis et al.
U.S. Appl. No. 11/536,059, filed Sep. 28, 2006, Amaitis et al.
U.S. Appl. No. 11/536,094, filed Sep. 28, 2006, Amaitis et al.

"Bet With the People Who Know Racing," Racing Daily Forum, 15 pages, Jul. 24, 2001.

"Quote of the Day; Bet of the Day," London Times, 1 page, Jul. 30, 2003.

TradeSports Trading & Betting Exchange, Best Lines & Bonuses, "What is Tradesports?," www.tradesports.com, 2 pages, Apr. 27, 2004.

Finspreads—About financial spread betting, Wayback Machine, Dec. 24, 2008, pp. 1-12 ("Finspreads").
Tulloch, Freddie, "Financial Spread Betting," Derivatives Use, Trading, & Regulations, London: 2003, vol. 9, Iss. 1, p. 28, 4 pgs.
"There was time when financial spread betting was just a way to "punt" on the financial markets, purely a gambling product with wide spreads and odds firmly in the bookmaker's favour," Sunday Business, London (UK), Nov. 30, 2003, p. 1.
USPTO Office Action for U.S. Appl. No. 11/745,573, Jan. 9, 2008 (6 pages).
USPTO Office Action for U.S. Appl. No. 10/794,668, May 28, 2008 (6 pages).
USPTO Office Action for U.S. Appl. No. 10/794,668, Oct. 6, 2008 (9 pages).
USPTO Office Action for U.S. Appl. No. 10/795,163, Nov. 25, 2008 (14 pages).
USPTO Office Action for U.S. Appl. No. 11/535,662, Aug. 21, 2008 (12 pages).
USPTO Office Action for U.S. Appl. No. 11/535,662, Dec. 22, 2008 (12 pages).
USPTO Office Action for U.S. Appl. No. 11/536,094, Jul. 22, 2008 (15 pages).
U.S. Appl. No. 11/841,049, filed Aug. 20, 2007, Amaitis et al.
USPTO Office Action for U.S. Appl. No. 11/745,573, Jan. 9, 2009 (6 pages).
USPTO Office Action for U.S. Appl. No. 11/745,646, Jun. 25, 2009 (10 pages).
USPTO Office Action for U.S. Appl. No. 11/745,573, Jul. 22, 2009 (10 pages).
USPTO Office Action for U.S. Appl. No. 10/794,666, May 21, 2009 (13 pages).
USPTO Office Action for U.S. Appl. No. 10/794,668, Sep. 15, 2009 (16 pages).
U.S. Appl. No. 12/563,985, filed Sep. 21, 2009, Amaitis et al.
"NTRA All-Star Jockey Championship Special Wagers," 3 pages.
"Wagering Information; Straight or Basic Wagers," Lone Star Park at Grand Prairie: Player's Guide, http://www.lonestarpark.com/bet_info.asp, 3 pages.
"Wagering Information; Straight or Basic Wagers," NTRA.com, http://www.ntra.com/news.asp?type=playthehorses&id=4799, 3 pages.
"Glossary of Terms," NTRA.com, http://www.ntra.com/news.asp?type=playthehorses&id=4797, 3 pages.
"The Basics of Horseplay," NTRA.com, http://www.ntra.com/news.asp?type=playthehorses&id=4795, 2 pages.
"Bet With the People Who Know Racing," Racing Daily Forum, 15 pages, Jul. 24, 2001.
"Quote of the Day; Bet of the Day," London Times, 1 page, Jul. 30, 2003.
TradeSports Trading & Betting Exchange, Best Lines & Bonuses, "What is Tradesports?," www.tradesports.com, 2 pages, Apr. 27, 2004.
Patent Pending Application entitled "System and Method for Wagering Based on Financial Market Indicators," by Lee M. Amaitis, et al., 23 total pages, filed Apr. 29, 2004.
U.S. Appl. No. 12/726,954, filed Mar. 18, 2010, Davie et al.
USPTO Examiner Interview Summary for U.S. Appl. No. 10/654,280, Aug. 7, 2006 (3 pages).
USPTO Notice of Allowance and Fees Due for U.S. Appl. No. 10/654,280, Jan. 25, 2007 (9 pages).
USPTO Notice of Allowance and Fees Due for U.S. Appl. No. 10/654,280, Mar. 12, 2007 (6 pages).
USPTO Notice of Allowance and Fees Due for U.S. Appl. No. 10/654,280, Mar. 20, 2007 (6 pages).
USPTO Notice of Allowance and Fees Due for U.S. Appl. No. 11/745,573, Nov. 18, 2009 (6 pages).
USPTO Notice of Allowance and Fees Due for U.S. Appl. No. 10/795,163, Dec. 18, 2009 (8 pages).
Trading Places: Even in difficult Financial times there are still ways for the on-line investor to make money. Niki Chesworth, Evening Standard p. 68, Nov. 26, 2001.
Online Spread Betting: A Risky Business, Peter Temple, FT EPAT May 1, 2002.
Australian Examiner's Report for Application 2005220915, dated Dec. 10, 2009 (2 pages).
Australian Examiner's Report for Application 2005241468 dated Jan. 12, 2010 (3 pages).
Australian Examiner's Report for Application 2005226038 dated Jan. 8, 2010 (2 pages).
Australian Examiner's Report for Application 2005220917, dated Jan. 8, 2010 (2 pages).
USPTO Office Action for U.S. Appl. No. 11/536,059, Feb. 5, 2010 (11 pages).
USPTO Examiner's Answer to Appeal Brief for U.S. Appl. No. 11/536,094, Oct. 26, 2009 (18 pages).
USPTO Office Action for U.S. Appl. No. 11/745,646, Feb. 3, 2010 (5 pages).
USPTO Pre-Brief Appeal Conference Decision for U.S. Appl. No. 11/535,662, Aug. 6, 2009 (2 pages).
USPTO Pre-Brief Appeal Conference Decision for U.S. Appl. No. 11/535,662, Aug. 25, 2009 (3 pages).
USPTO Examiner's Answer to Appeal Brief for U.S. Appl. No. 11/535,662, Mar. 16, 2010 (12 pages).
USPTO Office Action for U.S. Appl. No. 11/467,047, Apr. 29, 2010 (6 pages).
USPTO Pre-Brief Appeal Conference Decision for U.S. Appl. No. 10/794,668, May 13, 2010 (2 pages).
USPTO Office Action for U.S. Appl. No. 11/745,646, Aug. 5, 2010 (7 pages).
USPTO Notice of Allowance and Fees Due for U.S. Appl. No. 11/794,668, Jul. 7, 2010 (5 pages).
USPTO Notice of Allowance and Fees Due for U.S. Appl. No. 12/563,985, Jul. 6, 2010 (6 pages).
Australian Examiner's Report for Application 2007286823, dated Jun. 1, 2010 (4 pages).
USPTO Examiner Interview Summary for U.S. Appl. No. 11/745,646, Sep. 17, 2010 (2 pages).
Japanese Office Action with English translation for Application No. 2007-502044, dated Aug. 31, 2010 (6 pages).
USPTO Office Action for U.S. Appl. No. 11/536,059, Dec. 13, 2010 (10 pages).
International Preliminary Report on Patentability for International Application No. PCT/US05/46927, dated Jun. 26, 2007 (7 pages).
International Preliminary Report on Patentability for International Application No. PCT/US04/10028, dated Aug. 22, 2006 (4 pages).
International Preliminary Report on Patentability for International Application No. PCT/US04/10028, dated Oct. 18, 2006 (4 pages).
International Preliminary Report on Patentability for International Application No. PCT/US05/15001, dated Nov. 23, 2007 (5 pages).
International Preliminary Report on Patentability for International Application No. PCT/US05/15129, dated Feb. 24, 2009 (6 pages).
International Preliminary Report on Patentability for International Application No. PCT/US2005/006853, dated Sep. 5, 2006 (7 pages).
Japanese Office Action with English translation for Application No. 2007-511049, dated Sep. 21, 2010 (7 pages).
U.S. Appl. No. 12/947,702, filed Nov. 17, 2010, Inventors: Christopher John Davie, et al., entitled "System and Method for Wagering in a Financial Market Environment" (62 pages).
Around the World in Eighty Days, United Artists, 1956 (Wikipedia description attached), downloaded Dec. 13, 2010 (8 pages).
Australian Examiner's Report for Application 2009243500, dated Feb. 15, 2011 (3 pages).
www.finacial-spreadbetting.com/—Financial Spread Betting, A Trader's Guide, URL: http://web.archive.org/web/20040127223015/http://www.financial-spread-betting.com/.
USPTO Notice of Allowance and Fees Due and Examiner Interview Summary for U.S. Appl. No. 12/726,954, Dec. 22, 2010 (23 pages).
USPTO Office Action for U.S. Appl. No. 12/563,985, dated Apr. 19, 2011 (5 pages).

* cited by examiner

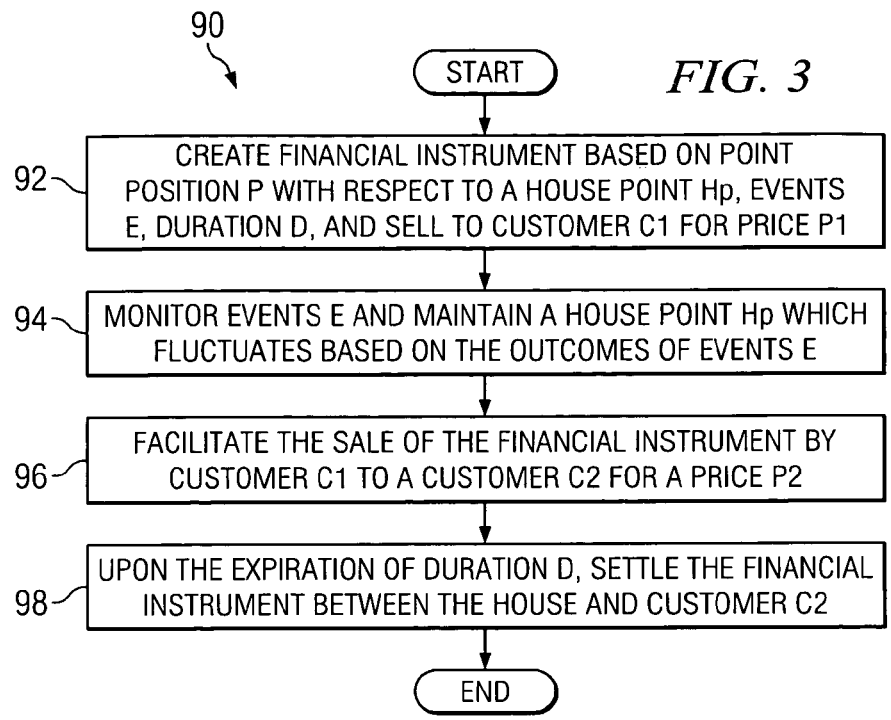
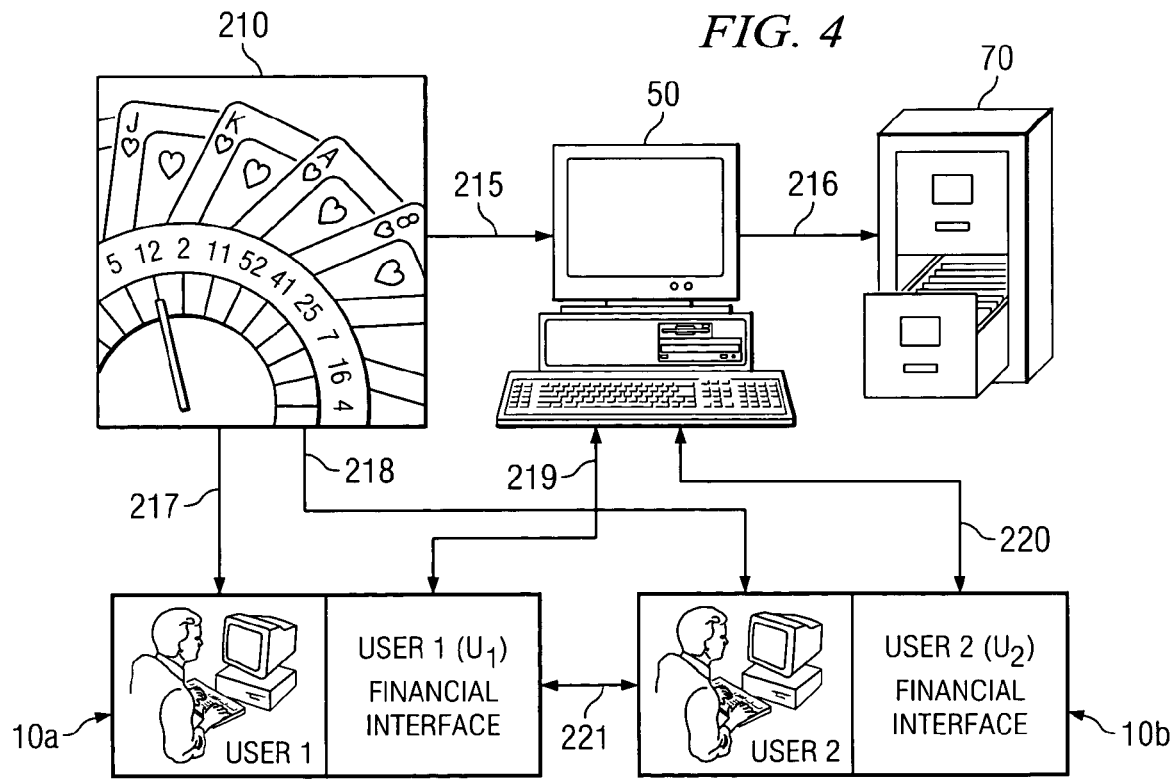

SYSTEM AND METHOD FOR WAGERING BASED ON THE MOVEMENT OF FINANCIAL MARKETS

CROSS REFERENCE TO RELATED APPLICATION

This application is a continuation-in-part of U.S. Ser. No. 10/654,280, filed on Sep. 3, 2003, now U.S. Pat. No. 7,233,922 which is related to and claims the benefit of U.S. Provisional Application No. 60/459,692, filed Apr. 2, 2003, and Nos. 60/460,540 and 60/460,537, both filed Apr. 4, 2003, and all of which are incorporated in their entirety herein by reference.

TECHNICAL FIELD OF THE INVENTION

The invention relates generally to the fields of gambling and financial instruments. More particularly, the invention relates to a system and method for wagering based on the movement of financial markets.

BACKGROUND OF THE INVENTION

Wagering in casinos and on sporting events is a large and growing industry throughout the world. Various types of betting products and systems exist that facilitate betting on the outcome of a particular game. For example, a patron in a casino may bet on a single hand of blackjack, a pull on a slot machine, a roll of the dice, etc. Typical horse racing bets allow bettors to wager on a single horse or on several horses in a particular race or series of races. For instance, a bettor can wager on a particular horse to finish first (win), finish in the top two (place), or finish in the top three (show). A bettor may also make various combination bets with multiple horses, such as an exacta bet (covering the top two horses in order) or a trifecta bet (covering the top three horses in order). In addition, a bettor may bet on a series of races, such as the daily double (winners of two consecutive races), the pick-three (winners of three consecutive races), and the pick-six (winners of six consecutive races).

Those betting on other sports may wager, for instance, on various aspects of the outcome of a particular game, including the winning team, the point margin by which that team wins, the combined final score of both teams, and so on. Wagers of this kind are generally well-known and unexceptional. Games or events (the terms "games" and "events" are used interchangeably to connote some probabilistic occurrence) upon which wagers may be placed may be viewed as games of pure chance (e.g., a coin toss or roulette wheel spin (assuming the game is a "fair" one with no intervening human or mechanical influence skewing mathematical random distributions of outcome)); games of mixed skill and chance (e.g., blackjack or horse racing); or games perceived of as consisting of pure skill (e.g., soccer, chess). All these games and events are believed to be at least somewhat probabilistic in nature. That is, there is more than one possible outcome that is not preordained. Even in games that are perceived as games of pure skill, it is believed that an effectively random element (based on, e.g., weather conditions, unforeseen player injuries, etc.) is almost always present.

Slot machines or other machines for player-initiated games of skill or chance (sometimes referred to as, or including video lottery terminals or video poker games) are becoming increasingly common fixtures in numerous jurisdictions across North America and elsewhere throughout the world. Conventional slot machines have one or more "pay lines" by which to determine whether the spin is a winning one. With each spin, different symbols appear on three or more reels (such as cherries, oranges, bells, or sevens). Preset combinations of symbols on the pay line return predetermined amounts to the player (e.g., three cherries may pay five times the amount wagered). Each spin of the reels generally represents one separate wager.

Most betting systems of the prior art are similar to a pull on a slot machine or a single hand of black jack in that they are based on the outcome of a single event or game—a "one-off transaction." An exception may be found in certain progressive or "jackpot" slot machine systems, but there are generally few means by which a player may take a betting position regarding the outcomes over time of a series or plurality of events that may or may not be related.

SUMMARY OF THE INVENTION

The invention herein disclosed is a system and method for structuring and facilitating the exchange of wagering-based transferable financial instruments that embody a betting position. The financial instrument may be traded, purchased, or sold during the lifetime of the underlying wager(s). The system and method further provide for the settling of all transactions and arbitration of all disputes associated with the exchange of any wagering-based transferable financial instruments. More specifically, the invention may be used to facilitate betting on the combined outcomes of a plurality of predefined probabilistic events (including events previously viewed as one-off events). This is accomplished by first establishing a market for the wagering-based financial instruments. The value of each financial instrument will initially be represented by its initial purchase price. Over time, this value will change and be subsequently represented by a position which reflects the outcomes of the plurality of probabilistic events which underlie each financial instrument.

The probabilistic events may generally be some traditional gambling or sporting events (e.g., casino-type events (slot machines, roulette), horse races, bingo, etc.), may be based on financial markets, or may be based on any other series of events having uncertain or partially uncertain outcomes (i.e., where any combination of chance/skill is the determinative, and not-entirely-predictable, basis for the outcome of such event(s)). The value of the instrument will necessarily fluctuate over time in accordance with the outcomes of those various events in a manner analogous to that observed for the market fluctuations commonly associated with derivatives trading. The instrument may be transferred, purchased, and sold, in much the same way that common stock may be transferred.

The creation of such financial instruments and positions may take place as an addition to, or in tandem with, the player's own "one-off" wager. That is, the individual wagerers as to the one-off events could be non-participants in, and may even be unaware of, the market generated in instruments based upon their particular one-off outcomes. Alternatively, the players could be partially or fully involved or invested in the financial instrument derived from the combination of their one-off wagers. This means that individual bettors could be dually and actively engaged in the "one-off" wager as well as the financial instrument derived from the outcomes arising from the plurality or series of one-off wagers.

One possibility that flows from this arrangement is that sophisticated participants would be able to continually adjust their overall risk participation or exposure—for instance, by betting one way in an individual one-off transaction and taking the opposite position with respect to the outcomes of the plurality of otherwise one-off events. For example, a participant might first wager that the House will win over 60% of all hands of blackjack played at a given blackjack table over a period of six hours. However, this same participant may attempt to mitigate the risk associated with his wager by actually attempting to play against the House in an individual game of blackjack during the six hour period at the given blackjack table, or perhaps by placing a second wager that the next player to play against the House during the six hour period will win at the given blackjack table. Such blended risk-participation strategy allows participants effectively to balance or "hedge" at a sophisticated level their betting portfolio in a manner similar to an investor hedging an investment portfolio by offsetting trading in the derivatives' underlying securities.

The present invention's system for structuring and facilitating the exchange of all such wagering-based financial instruments may also provide background and statistical information that individuals will find helpful not only in originally formulating their positions as to various betting-based financial instruments, but in any attempts to value their individual financial instruments or hedge their complete betting portfolios.

An important difference that distinguishes the present system from previous ones based on traditional derivative trading is that a client's success or failure will not be as heavily reliant on any putative or singular "value" underlying a one-off transaction or a series of one-off transactions. While the return to a trader of a traditional derivative product is, in many cases, largely determined by the value of the underlying security, asset, liability, or claim on which the derivative is based, the return to an investor in the financial instruments of the present invention can be made more dependent on functions of chance, which can be insulated from the occasional and rare systematic fluctuations which can be attributable to specific market participants.

Thus, the system creates a semi-autonomous pecuniary market where none is believed to have previously existed, producing novel financial instruments that are subject to both principles of market demand and the whims of man. Moreover, the system facilitates the exchange of these hitherto-unknown financial instruments between and among clients and the system itself.

In one exemplary embodiment of a system according to the present invention, a method for facilitating a wager on a position with respect to the outcomes of a plurality of events is provided, and includes the steps of establishing a "point" value, receiving order data from a first client regarding the wager, determining a position based on at least one of the order data or information regarding the plurality of events, and providing a financial instrument that represents the position. Other embodiments include additional steps for matching a bid and offer to facilitate the transfer of the financial instruments, and for transmitting and displaying data related to valuations for the financial instruments.

In another exemplary embodiment of a method according to the present invention, a system for creating a transferable financial instrument based on a position regarding the outcomes of a plurality of events is provided, and includes a data storage, a monitoring device for monitoring the outcomes of at least one of a plurality of events, and a processor coupled to a memory. The processor is operable to receive order data from a client regarding a wager, establish a position for the client based on the received order data, record information related to the plurality of events, identify fluctuations in the value of the position based on the information related to the plurality of events, and transmit data regarding the value of the position.

In yet another exemplary embodiment of a method according to the present invention, a system and market for trading wagering-based financial instruments is provided. The market includes at least one financial instrument that embodies a position with respect to a wager regarding a plurality of events which occur over a period of time, at least one bid, and at least one offer, wherein at least one bid is matched with at least one offer, resulting in a transfer of the financial instrument from a first owner to a second owner. Electronic platforms for trading of such instruments are also provided.

BRIEF DESCRIPTION OF THE DRAWINGS

FIG. 3 depicts one embodiment of a method of creating, trading, and settling a wagering-based financial instrument.

FIG. 4 depicts a functional block diagram illustrating one embodiment of the present invention in operation.

Figure 1:
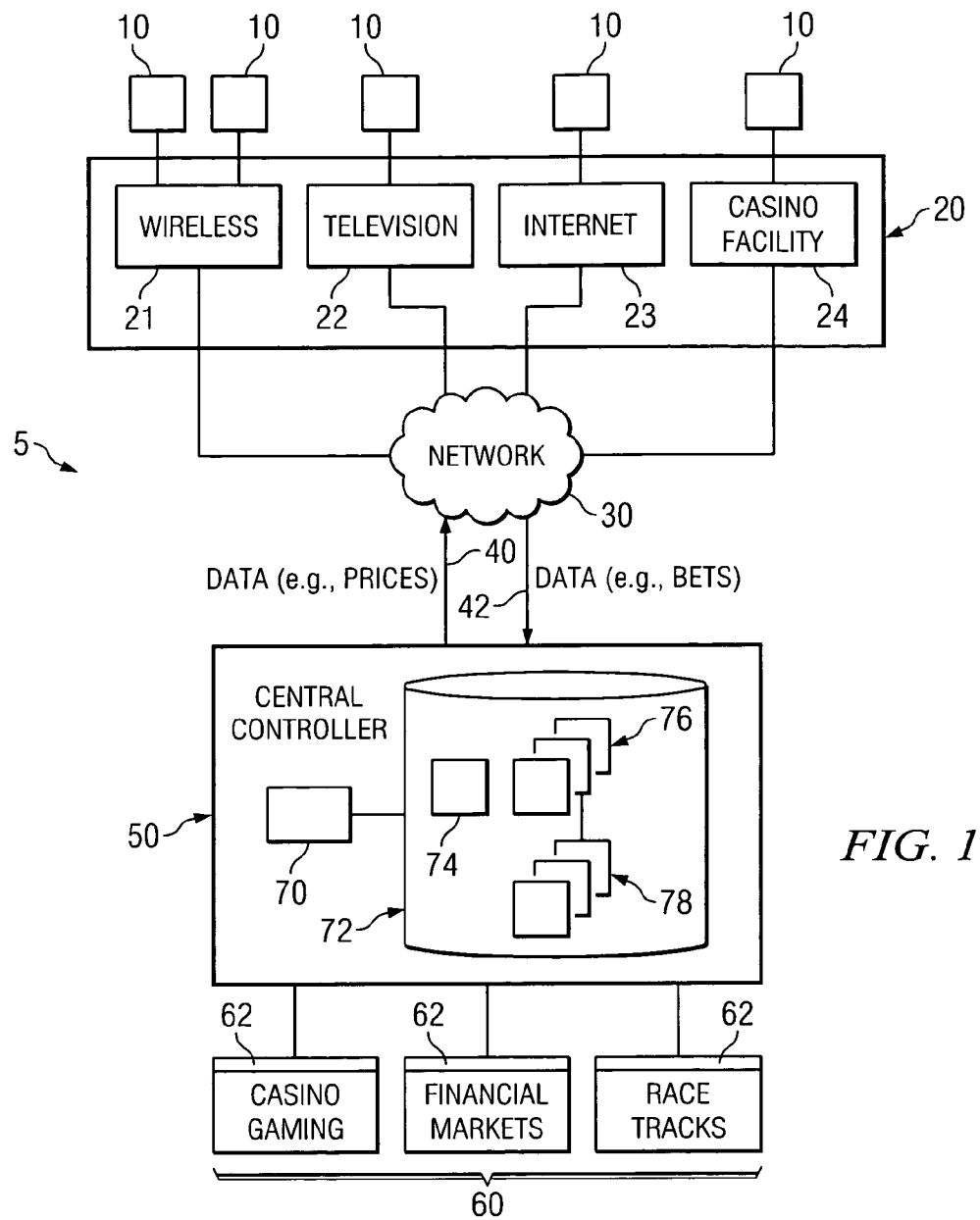
FIG. 1 depicts a system block diagram for creating, trading, and settling a wagering-based financial instrument in accordance with one embodiment of the present invention.

Throughout the FIGURES, the same reference numerals and characters, unless otherwise stated, are used to denote like features, elements, components, or portions of the illustrated embodiments. Moreover, while the present invention will now be described in detail with reference to the Figures, it is done so in connection with the illustrative embodiments.

DETAILED DESCRIPTION

FIG. 1 illustrates one embodiment of a system 5 that includes clients 10 coupled to a central controller 50 using one or more interfaces 20 and a communication network 30. Central controller 50 is further coupled to one or more event generators 60. In general, system 5 provides for the creation, trading, and settling of wagering-based financial instruments 76.

Financial instruments 76 are derived from a wager that is made with respect to the outcome of one or more probabilistic events. The types of probabilistic events that can be used as the basis for creating financial instruments 76 are multitudinous. For example, numerous forms of traditional gambling events may be the subject of financial instruments 76. These events may include "one-off" events in which a bettor traditionally places a single wager on a single intermediate or final outcome such as wagers based on the spins of slot machines, outcomes of roulette games, craps games, bingo games, blackjack hands, results of horse races, and so on. Note that the present invention is not limited to deriving financial instruments 76 from wagers on purely "one-off" events, as there are many known wagers requiring tracking of a combination of outcomes, e.g., daily double racing bets or sports parlay or "teaser" bets, all of which could also be used to construct derived financial instruments 76.

Additionally, numerous other events may form the basis for financial instruments 76, including events associated with the financial markets, television shows, and even the weather. For example, with respect to financial markets, the events might involve the movement or the value of a financial market index, security, or other instrument, referred to generally as a financial market indicator, during or at the end of a predetermined period of time or after one or more relevant transactions. Outcomes for these events might involve, for example, whether a certain financial market index, such as the Dow Jones Industrial Average (DJIA) or the Financial Times Stock Exchange (FTSE), will rise or decline during the upcoming seconds, minutes, hours, or other predetermined period of time, or after one or more relevant transactions. The index may be rounded to the nearest whole point (e.g. an average of 9,314.62 may be rounded up to 9,315), trade in whole points, and in the event the index stayed at the same level, the wager could be deemed either a loss or a tie.

In particular embodiments, the movement of a financial market indicator may be graphically represented on an electronic screen associated with a buyer or seller of financial instruments 76 using symbols such as, for example, color coded (e.g., red, green, or yellow) arrows. Each symbol could indicate that the value of the associated financial market indicator was down during the last predetermined period of time or after the last relevant transaction or transactions (e.g., red down arrow); up during the last predetermined period of time or after the last relevant transaction or transactions (e.g., green up arrow); or unchanged during the last predetermined period of time or after the last relevant transaction or transactions (e.g., yellow sideways arrow). Any suitable number and combination of symbols could combine to represent a suitable portion of the history of the movement of the value of the financial market indicator. Financial instruments 76 may be based upon underlying wagers associated with the movements of a financial market indicator or the graphical representations associated therewith. For example, underlying wagers could be that all symbols in a series will be one of red, green, or yellow arrows; that the symbols of a series will be a particular number, combination, or ordering of red, green, and yellow arrows; that a particular symbol in a series will be one of a red, green, or yellow arrow; that the next symbol will be one of a red, green, or yellow arrow; etc.

Other outcomes to these events might involve whether the value of the indicator will be an odd or even number at the end of a predetermined period of time or after the last relevant transaction or transactions. Further outcomes might involve whether the value of the indicator will fall within particular ranges of numbers at the end of a predetermined period of time or after the last relevant transaction or transactions. These events and outcomes form the basis for transferable financial instruments 76. Wagering on the movement of the financial markets or the value of the financial markets, and the transferable financial instruments 76 derived therefrom, could be based upon fixed odds payouts, spread betting payouts, or other forms of payouts.

A bet may further be based upon the movement or value of multiple financial markets during a predetermined period of time. This bet may be stored in a memory 72 and processed by a processor 70, each of which is described in greater detail below, and then used in some embodiments to create a financial instrument 76. For example, a bet or underlying wager may include a plurality of bet components. A first bet component may indicate whether a value of a first financial market indicator, such as the value of the DJIA, will go up or go down in a first predetermined period of time, such as the next ten seconds. A second bet component may indicate whether a value of a second financial market indicator, such as the value of the NASDAQ, will go up or go down in a second predetermined period of time. The bet may also comprise additional bet components that indicate whether the value of other financial market indicators (e.g., the value of the FTSE, the S&P 500, the New York Stock Exchange, or any other suitable financial market indices) will go up or down in the predetermined period of time. Alternatively, the additional bet components may indicate whether the value of the same financial market indicators will go up or down in a different predetermined period of time.

The outcome of the bet is determined based upon the outcomes of the various bet components. For example, the outcome of the first bet component is based at least in part upon whether the value of the first financial market indicator went up or down in the predetermined period of time. If the first bet component indicated that the DJIA would go up at the end of ten seconds, and if the DJIA did indeed go up at the end of ten seconds, then the outcome of the first bet component is a win. The outcome of the second bet component is based at least in part upon whether the value of the second financial market indicator went up or down in the predetermined period of time. If the second bet component indicated that the NASDAQ would go down at the end of ten seconds, and if the NASDAQ did indeed go down at the end of ten seconds, then the outcome of the second bet component is also a win. In one embodiment, if the value of the financial market indicator is unchanged at the end of the predetermined period of time, the outcome of the related bet component is deemed a loss. The outcomes of additional bet components may be similarly determined.

These bets based on the value of multiple financial market indicators may further be based upon whether a particular digit of the value is an odd or even number at the end of a predetermined period of time. For example, a first bet component may indicate whether a particular digit, such as the last digit, of the value of a first financial market indicator, such as the value of the DJIA, will be odd or even at the end of a first predetermined period of time, such as the next ten seconds. A second bet component may indicate whether a particular digit, such as the last digit, of the value of a second financial market indicator, such as the value of the NASDAQ, will be odd or even at the end of a second predetermined period of time. The bet may also comprise additional bet components that indicate whether particular digits of other financial market indicators (e.g., the value of the FTSE, the S&P 500, the New York Stock Exchange, or any other suitable financial market indices) will be odd or even at the end of the predetermined period of time. Alternatively, the additional bet components may indicate whether the same financial market indicators will be odd or even at the end of a different predetermined period of time.

The outcome of the bet is determined based upon the outcomes of the various bet components. For example, the outcome of the first bet component is based at least in part upon whether the last digit of the first financial market indicator was odd or even at the end of the predetermined period of time. If the first bet component indicated that the last digit of the DJIA would be odd at the end of ten seconds, and if the last digit of the DJIA was indeed odd at the end of ten seconds, then the outcome of the first bet component is a win. The outcome of the second bet component is based at least in part upon whether the last digit of the second financial market indicator was odd or even at the end of the predetermined period of time. If the second bet component indicated that the last digit of the NASDAQ would be even at the end of ten seconds, and if the last digit of the NASDAQ was indeed even at the end of ten seconds, then the outcome of the second bet component is also a win. The outcomes of additional bet components may be similarly determined.

In still another example, the bets based on the value of multiple financial market indicators may further be based upon whether a particular digit of the value falls within a range of numbers at the end of a predetermined period of time. Any suitable number and combination of numerals can be used to form the range of numbers for any given bet. For example, one bet could be formed based on five ranges of numbers: 0-1, 2-3, 4-5, 6-7, and 8-9. In another example, a bet could be formed based on three ranges of numbers: 0-3, 4-6, and 7-9. In still another example, a bet could be formed based on two ranges of numbers: 0-4 and 5-9. Moreover, particular numerals may be excluded from any of the ranges, or included in multiple ranges, as desired. These ranges are illustrative only.

For a bet based on two ranges, for example, a first bet component may indicate whether a particular digit, such as the last digit, of the value of a first financial market indicator, such as the value of the DJIA, will be in a first range of 0-4 or in a second range of 5-9 at the end of a first predetermined period of time, such as the next ten seconds. A second bet component may indicate whether a particular digit, such as the last digit, of the value of a second financial market indicator, such as the value of the NASDAQ, will be in the first range of 0-4 or in the second range of 5-9 at the end of a second predetermined period of time. The bet may also comprise additional bet components that indicate whether particular digits of other financial market indicators (e.g., the value of the FTSE, the S&P 500, the New York Stock Exchange, or any other suitable financial market indices) will be in the first range of 0-4 or in the second range of 5-9 at the end of the predetermined period of time. Alternatively, the additional bet components may indicate whether the same financial market indicators are in the first range of 0-4 or in the second range of 5-9 at the end of a different predetermined period of time. Although this example uses the same ranges (e.g., 0-4 and 5-9) for each component of the bet, it should be understood that any portion of the ranges used for different components of the bet may be the same or different without departing from the scope of the present disclosure. Moreover, a first component of a bet may be based upon one of a first number ranges (e.g., one of two ranges) while the other components of the bet may be based upon one of any other number of ranges (e.g., one of three ranges).

The outcome of the bet is determined based upon the outcomes of the various bet components. For example, the outcome of the first bet component is based at least in part upon whether the last digit of the first financial market indicator was in the first range of 0-4 or in the second range of 5-9 at the end of the predetermined period of time. If the first bet component indicated that the last digit of the DJIA would be in the first range of 0-4 at the end of ten seconds, and if the last digit of the DJIA was indeed in the first range of 0-4 at the end of ten seconds, then the outcome of the first bet component is a win. The outcome of the second bet component is based at least in part upon whether the last digit of the second financial market indicator was in the first range of 0-4 or in the second range of 5-9 at the end of the predetermined period of time. If the second bet component indicated that the last digit of the NASDAQ would be in the second range of 5-9 at the end of ten seconds, and if the last digit of the NASDAQ was indeed in the second range of 5-9 at the end of ten seconds, then the outcome of the second bet component is also a win. The outcomes of additional bet components may be similarly determined.

For each of the example types of bets described above, the predetermined period of time for the second bet component may be the same or different than the predetermined period of time for the first bet component. The predetermined period of time may be specified by the bet itself for some or all of the bet components. The second bet component may also be associated with the same financial market indicator as was the first bet component. The source of the financial market indicator for any bet component may also be specified by the bet itself.

The outcomes of each of the three example bets may be decided according to the following rules. If the outcome of each bet component is a win, then the overall bet outcome is a win. If the outcome of any of the bet components is a loss, then the overall bet outcome is a loss. Alternatively, the overall bet outcome could be considered a win if any predetermined number of bet component outcomes is determined a win. In this alternative embodiment, the payout that is determined for the bet is based at least in part upon the number of bet components that are determined to be a win. The payout is also based upon the bet amount associated with the bet.

In particular embodiments, one or more bets described above may comprise underlying wagers used to form a financial instrument 76. In such embodiments, the financial instrument 76 comprises a price that is based at least in part upon a point count that varies according to the outcomes of at least a portion of the bet components of any given bet, or the overall bet outcomes of multiple bets that form the financial instrument 76. The financial instruments 76 may then be transferred between parties according to the established price. Further details of financial instruments 76, including prices, point counts, and transfers, are provided below.

In another example, with respect to television shows, the events might involve whether or not a first participant of a reality-based television show will select a second participant of the show for marriage, to remain on the show, to be excluded from the show, or to otherwise be involved in the show. In another example, the events might involve the performance of a participant with respect to voting by viewers of the show. In particular, the events might involve whether a participant will receive the most or fewest votes by the viewership during a predetermined voting period; whether a participant will receive a certain number or percentage of votes by the viewership during a predetermined voting period; whether a first participant will receive more or less votes than a second participant during a predetermined voting period; or voting on whether an incident, occurrence, or happening should take place on the show. In other examples, the events might involve whether or not a participant of a game-show will answer a question correctly, win a prize, or otherwise succeed or fail on the show. The event(s) that can form the basis for financial instruments 76 are therefore any event or concatenation of events, the outcome of which is not certain at the time the proposition is being evaluated.

Financial instrument 76 may take many forms. For example, financial instrument 76 may be a paper instrument, an electronic instrument, or some other concrete, virtual, or notional embodiment that represents ownership of or an interest in the underlying wager. Over time, the value (or perceived value) of an instrument 76 may change based on numerous factors, including outcomes of some of the plurality of events which form the basis of the instrument 76, or outcomes of other related events that may affect the outcome of the wagered position. "Value" in this context is defined, generally, as including principally the amount that an interested buyer would pay a willing seller in order to assume control of or an interest in an instrument 76. Determination of any absolute "value" beyond this definition is not required for practice of this invention.

The value of a financial instrument 76 may track the outcomes of its underlying events according to a "point system" whereby positive or negative points are assigned to various outcomes of events and the overall point value for the event is updated as the event or events progress. For example, a "point" may be created for subsequent wagering based upon the numerous spins of the reels on slot machines, roulette wheels, or other games of chance located at a casino facility. As a particular financial instrument 76 may be based on a plurality of different types of events, the value of a financial instrument 76 may track a "blended" point value. For example, a blended point value $\beta$ could be based upon a mathematical function ($\beta$=an+bp) of two or more variables, n and p, wherein n is a sub-point based upon outcomes of a first type of underlying event (e.g., slot machine pulls) and p is a sub-point based upon the outcomes of a second type of underlying event (e.g., roulette wheel spins).

Moreover, financial instruments 76 may be bought, sold, exchanged, or otherwise transferred using system 5. For example, financial instruments 76 may be traded through electronic transactions and platforms via the Internet and/or over various wireless connections. Financial instruments 76 could also be traded using paper certificates, through tokens, smart cards, tote boards, virtual wallets, or any other known system for tracking, trading, redeeming, and evidencing an account, ownership position, or other form of valuta. Therefore, system 5 and methods associated therewith may not only be used to establish wagers, but may also be used to facilitate transactions involving the financial instruments 76 that embody such wagers, essentially creating a market in those wagers. The transfer of financial instruments 76 may take place among clients 10 and between a client 10 and a "house," a platform, bookmaker, or some other market making participant of system 5. For example, a financial instrument 76 may be initially established by a market making participant of system 5 and transferred to a client 10. The financial instrument 76 may then be transferred any number of times among clients 10 or with the market making participant of system 5 before the financial instrument 76 is settled.

Clients 10 are various users of system 5 that may place wagers embodied in financial instruments 76, trade financial instruments 76, and settle financial instruments 76. Clients 10 may also refer to the devices used by various users of system 5. Examples of these devices include a computer, a personal digital assistant, a cellular phone, a kiosk or point of sale terminal, or any other device that can display information from and communicate with various elements of system 5.

An interface 20 provides a portal for clients 10 to access other elements of system 5. In one embodiment, interface 20 comprises a wireless network 21, a television network 22 (e.g., cable, satellite, closed-circuit, etc.), the Internet or other local or wide area networks 23, or a casino gambling facility 24. Any suitable number and combination of interfaces 20 may be implemented in system 5 according to usage, traffic, architecture, and other considerations.

Communication network 30 may comprise any suitable number and combination of local area networks, wide area networks (e.g., the Internet), wireless networks, or any other type of network that transfers data between central controller 50 and the various clients 10 of system 5. All or a portion of communication network 30 may be a proprietary network. The transfer of data on network 30 may include a two-way transfer, with data 40 communicated to network 30 and eventually to clients 10, and data 42 communicated to central controller 50. Data 40 that is communicated to clients 10 may include such information as prices for various positions, updated values for financial instruments 76, total number of wagers, payouts, spreads, over/unders, ranges, or any other information associated with financial instruments 76. Data 42 that is communicated from clients 10 to central controller 50 may include such information as new wager orders transmitted from clients 10, requests for status information, or trading information for financial instruments 76.

Central controller 50 comprises a processor 70 coupled to a memory 72 that may be implemented as a mainframe, a series of connected workstations, or in any other suitable computing environment and architecture. Processor 70 executes software application 74 to perform various features and functions for creating, trading, and settling financial instruments 76 described herein. Memory 72 stores software application 74, various incarnations of financial instruments 76, and information 78 associated with financial instruments 76. Central controller 50 is coupled to event generators 60 that include slot machines, roulette wheels, blackjack tables, or any other suitable casino gaming applications; stock markets, bond markets, or any other suitable financial markets; race tracks (e.g., horse, dog, auto, etc.); or any other suitable generators of events upon which financial instruments 76 are based. Event generators 60 may be associated with various types of monitoring interfaces 62 that allow central controller 50 to capture information associated with the occurrence of events forming the basis for financial instruments 76. Although the following example is detailed with respect to a particular type of event generator 60—slot machines—it should be understood that system 5 operates with respect to any suitable type, number, and combination of event generators 60.

Processor 70 may gather information from actual slot machines located in live or simulated casino facilities. These slot machines may be played by users, or automatically operated as randomized "virtual slots," in accordance with the present invention. The outcomes of the respective final reel positions of the slot machines after each "pull" may be transferred to central controller 50 using different types of monitoring interfaces 62. For example, the machines may be recorded via live video and the data extrapolated from the video feed through a variety of manual or automated techniques. Alternatively, and advantageously, the slot machines themselves may be mated to monitoring equipment, which transmits the outcomes of each pull event to the central controller 50 electronically.

In alternative embodiments of the present invention in which the point is defined in part by outcomes of other games of skill or chance, methods for recording outcomes may include similar electronic monitoring and transmission equipment, as well as manual input of outcomes when appropriate. In the instance of, e.g., blackjack as the basis for a point, card values may be recorded by automatic shape and character recognition in conjunction with video surveillance cameras fixed on the card table. The prevalence of video monitoring in casinos for security purposes, together with known optical character and shape recognition software, provides numerous opportunities for the automation of outcome-gathering steps in the present invention.

Notably, the slot machines whose outcomes are used to determine a point value in the above-described embodiment need not necessarily be located in the same facility. For example, a portion of the slot machines may be located in one facility, and another portion of slot machines may be located in any number of other facilities that are geographically remote. Furthermore, the system and method of the present invention are not limited to any number of slot machines, and may be configured to monitor the outcomes of hundreds or thousands of slot machines located in a large number of different facilities. The slot machines may be located in any number and combination of facilities, such as, for example, casinos, airports, racetracks, or any other suitable location.

Figure 2:
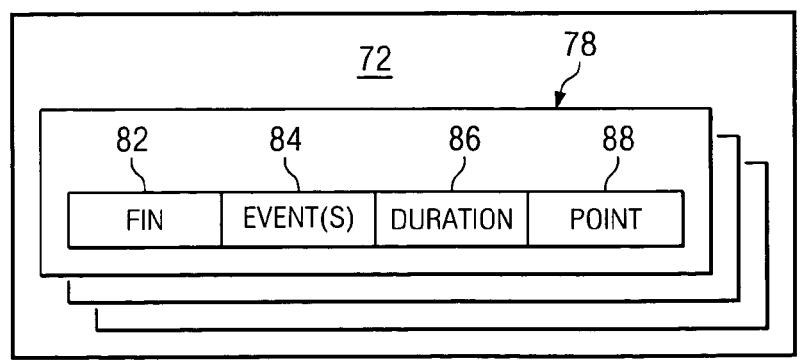
FIG. 2 depicts information stored for wagering-based financial instruments.

Memory 72 of central controller 50 may store information regarding the various types of different wagers that may be placed and the outcomes of various events. For example, memory 72 may be used to store slot machine results from a particular casino, or even for a group of casinos combined. Memory 72 also stores information 78 associated with each financial instrument 76. Information 78, illustrated in greater detail with reference to FIG. 2, may include Financial Instrument Number (FIN) 82, a description of the event(s) 84 which are the subject of the particular instrument 76, a designated duration 86, and the point position 88 (and/or price) established in the particular instrument 76. These fields (and others) may be defined in numerous ways within the scope of the present invention. For example, duration 86 may refer to a particular closing or settlement date for the financial instrument 76, or may be based on the events themselves that may be completed on some uncertain date in the future.

One embodiment of a method for creating, trading, and settling a financial instrument 76 is illustrated in flowchart 90 of FIG. 3. Execution begins at step 92 where a financial instrument 76 is created based on numerous factors, such as the events which are the subject of the instrument 76, the duration of the instrument 76, and the point position embodied by the financial instrument 76 with respect to a current house position. The point position embodied in the financial instrument 76 may comprise an initial point position for the underlying events and may be taken into account in determining the initial value of the financial instrument 76. The financial instrument 76 is transferred from the house to a first client 10 for a determined price.

Execution proceeds to step 94 during the duration of the instrument 76, where the house monitors the events underlying financial instrument 76 in order to update regularly the house point based on the outcomes of those events. The house point may increase or decrease according to the outcome of various underlying events thereby affecting the value of financial instrument 76. Such information may be broadcast to clients 10 of system 5 so that they may be apprised of the changing value of their financial instruments 76, and further to facilitate trading of the instruments 76 between clients 10 based on their changing valuations.

At step 96, a sale of the financial instrument 76 from a first client 10 to a second client 10 is facilitated, presumably based on some price that is set within the relevant "market." This transaction may occur according to techniques whereby an offer price and a bid price for a particular instrument are matched, and a sale is transacted. Though only a single transaction of the instrument 76 is depicted in FIG. 3, it should be understood that the instrument 76 may change hands any number of times during its lifetime and prior to its eventual settlement. Clients 10 may buy or sell a financial instrument 76 at any time and for any amount (assuming a willing counter-party is available to pay such amount for the financial instrument 76 at such time), and can also establish pre-set stop loss and sell orders, to limit a loss or lock-in a profit. In the event the value of the financial instrument 76 reaches a level at which a client's credit is fully extended, he might be automatically "closed out" of his position through entry of an automatic sell order.

At step 98, upon expiration of the duration of the underlying events, the financial instrument 76 is settled between the present owner of the financial instrument 76 and the house based upon the outcomes of the underlying events and the wagering positions in those events which are embodied in the financial instrument 76. Any balance due to the client 10 may be paid by the house, or conversely, any balance due to the house by the client 10 may be paid to the house. Determination of the paying party and receiving party and the amount of the payment may be made according to a relation between the final value of the house point, or final point count, as of the expiration of the duration (as described in the financial instrument 76) and the initial point position, or initial value, established in the financial instrument 76. Some or all of the steps illustrated in flowchart 90 may be performed by elements of system 5, including, for example, processor 70 of central controller 50 operating software application 74.

While system 5 and its associated methods are described herein from the perspective of the "house" (e.g., of a casino, who might implement the present invention to create financial instruments 76 based upon games being played in its own gaming area), the present invention is not limited to practice by the house. For instance, any party could practice the present invention by structuring (or providing a platform or system for the trading and settlement of) financial instruments 76 that are based upon, e.g., the publicly-known results of horse races at a given track, or based upon televised outcomes of any sporting event, wagering event, or any entertainment event or show, such as, for example, American Idol, The Bachelor, or other reality based television shows.

Moreover, even if the present invention is assumed to be practiced by the house, it should be recognized that the house need not necessarily be concerned with the "accuracy" of its point-setting for particular outcomes (and indeed, the particular point value assigned to any outcome need not necessarily be viewed as relating to or attempting to predict an "actual" statistical probability of such outcome), except in the case in which the house is taking a full or partial position as the "counter-party" or bank to a player or players, or undertakes to act as a "market maker" by taking a counter-position as to a player when no appropriate counter-party is available in the market. In such a case in which the house is taking a full or partial risk-based position, or acting as a market maker, it will wish at least to be aware of the probabilities (statistical and/or perceived) of certain outcomes, and at least to take those probabilities into account in conjunction with setting point values.

In the case in which the house or other party practicing the present invention is not an "equity" participant in the financial instruments 76 (i.e., is not acting as a bookmaker/risk-based-position holder) derived from the points set as to individual outcomes, though, such a party need not be concerned with the accuracy or statistical "realism" of a particular point value. An analogy may be found in, e.g., commodity futures, in which it is possible to structure a position based on the proposition that gold will trade at, e.g., $2000 an ounce six months from now. Even if this is perceived as an unrealistic "prediction" of the actual likely outcome of the commodities market, once such a proposition is defined, buyers and sellers may nonetheless trade in it based upon the (admittedly-remote and unrealistic) prospects of such an outcome, and discounting their bids accordingly.

In FIG. 4, one embodiment of system 5 is shown in operation. The process begins at some time $T_0$, involving user 1 10a and user 2 10b ($U_1$ and $U_2$, respectively). Although only two representative users or clients 10 are shown, system 5 itself is supplied with processing capability for supporting a large plurality of participants at any given time. At some point during or before the interactions begin, users 10a and 10b will provide a funding source of some sort, which may be accomplished as simply as by providing system 5 access to a bank account, a credit card, a house line of credit, or some other indicator of ability to pay in order to interface with system 5.

Users 10a and 10b view a selection of probabilistic events 210 from which to choose as the underlying basis for one or more financial instruments 76, as indicated by arrows 217 and 218. Events 210 are associated with event generators 60 from FIG. 1 and may include a series of sports events (e.g., an entire football season, every football game played on a Monday night, etc.), gambling events (e.g., the outcome of the next 100 hands of blackjack, the number of times the roulette ball lands on red over a one hour period, etc.), or arguably "random" (or difficult-to-predict/high standard deviation) events or outcomes (e.g., the amount of rainfall at Stonehenge on any given day, the rise or fall of a market index over any given period of time, etc.). Upon determining a selection of events 210 and establishing a wagering position thereon, the clients will communicate such wagering positions to the central controller 50. Central controller 50 establishes a financial instrument 76 embodying the parameters of each wagering position, and will return a confirmation message, as indicated by arrows 219 and 220.

After each financial instrument 76 is recorded in memory 72, as indicated by arrow 216, the financial instrument 76 will remain "live" or active for the duration of the probabilistic events wagered upon. If the financial instrument 76 depends on the outcome of the regular NFL football season, for example, the financial instrument 76 remains live for approximately seventeen weeks. If the financial instrument 76 depends on the number of aces of spades played in all hands of blackjack over the course of one day, for example, the financial instrument 76 remains live for one day. Irrespective of the underlying games or events, each financial instrument 76 will have a market life that corresponds with the duration of the underlying wager(s).

The value of the financial instrument 76 will likely vary with time according to the push and pull of miscellaneous market forces (e.g., supply and demand) and as unforeseen changes transpire (e.g., a star quarterback breaks his arm). For example, if user 10a ($U_1$) places a wager that outcome $O_1$ will occur at some time $T_1$, and user 10b ($U_2$) places a wager that (a different) outcome, $O_2$ will occur at time $T_1$, each will have a stake in the cumulative outcome of some series of events. This stake will be embodied by a transferable financial instrument 76 that is created by system 5. This financial instrument 76 remains transferable on the system-created market for such instruments 76. In other words, $U_1$'s stake in outcome $O_1$ will be embodied in some financial instrument 76, $F_1$, and $U_2$'s stake in outcome $O_2$ will be embodied in some financial instrument 76, $F_2$. Both $F_1$ & $F_2$ will be openly transferable using system 5. Both the value (and, a fortiori, the market price) of $F_1$ & $F_2$ may fluctuate with the changes in the underlying events 210. For example, assume that $O_1$ and $O_2$ are adverse and mutually exclusive outcomes. Assume that some relevant event 210, $E_1$ occurs at some time after the wager has been placed but before the wager is resolved. If $E_1$ has a positive effect on $O_1$, it will have a negative effect on $O_2$. This will cause the value of $F_1$ to rise and the value of $F_2$ to decline.

Below is an exemplary algebraic representation of several of the sets that are contemplated by an embodiment of the present invention:

$$G = \{G_1, G_2, G_3 ... G_N\}$$

$$[\exists G_N \in G, \exists W]$$

$W = \{W_1, W_2, W_3 ... W_M\}$
$O = \{O_{11}, O_{12}, O_{13} ... O_{21}, O_{22}, O_{23} ... O_{MN}\}$
$U = \{U_1, U_2, U_3 ... U_N\}$
$W_1 = \{O_{11}, O_{12}, O_{13} ... O_N\}$
$W_2 = \{O_{21}, O_{22}, O_{23} ... O_{2N}\}$
$W_3 = \{O_{31}, O_{32}, O_{33} ... O_{3N}\}$
.
.
.
$W_M = \{O_{M1}, O_{M2}, O_{M3} ... O_{MN}\}$
$K = \{\ \}$

The set G represents the set of all probabilistic games or events 210, or series of games or events 210 (note: the words "games" and "events" are used interchangeably to connote a probabilistic occurrence), which any system user 10 may wager upon. For each $G_N \in G$, there exists W. The set W represents the set of all unique wagers that may be placed on any given $G_N$. The set W may be user-defined or system-defined. The set O represents all possible outcomes for all possible events 210 that may be wagered upon. For each $W_M \in W$, there are a series of unique potential outcomes. The number of potential outcomes, of course, will vary with the nature of the event itself (i.e., the more inherently unique outcomes an event possesses, the greater the number of possible wagers, and thus unique potential outcomes, that are available to be wagered upon by the user). For example, the game of roulette will provide a greater number of potential wagers and outcomes than a coin toss ($W_{M\text{-}Roulette} > W_{M\text{-}CoinToss} \Rightarrow O_{MN\text{-}Roulette} > O_{MN\text{-}CoinToss}$). The set U represents the set of all users, or clients 10, with stakes in various outcomes, and the set K is the master set. A unique K exists for each user, and is discussed fully below. Any user U, may place a wager on any outcome $O_{MN} \in O$.

A user may thus observe G and the assortment of probabilistic events upon which any wager, W, may be placed at any time. For example, a user, $U_1$, may observe a roulette table (roulette being a "probabilistic event," $G_{Roulette}$, contained within the set G) at any given casino via live data (e.g., text, image, video, etc.) transmitted directly to him. $U_1$ may then observe the set $W_{Roulette}$ of all wagers that may be placed. At this point in time, $T_O$, $U_1$ may elect to place a wager on one (or more) unique outcome(s). For example, $U_1$ may wager that over the course of the next five hour period, over 90% of the roulette table spins will result in the roulette ball falling on a red roulette tile. This outcome could be denoted $O_{11}$. $O_{11}$ is certainly an outcome (although for purposes of illustration, an admittedly unlikely one) within the potential set of outcomes that exists—and the outcome may be correlated with a payment scheme that attempts to reflect, in various ways, the relative riskiness of the specific position undertaken.

At time $T_O$, when the wager is originally made, the wager itself is worth no more or less than what $U_1$ paid to place the wager (even though the wager may bear "long odds," i.e., may provide for a payment of multiple times the initial investment if the particular outcome to which the position related transpires). For example, $U_1$ may have placed this wager at a cost of $10. At time $T_O$, $U_1$ could, conceivably, sell the financial instrument 76 embodying this wager to another user, $U_2$, for $10. The wager has therefore become a financial instrument 76 whose value is based upon the course of the underlying probabilistic events 210. If it as assumed that 100 spins of the roulette wheel take place during the relevant five hour period, the market value of $U_1$'s wager may fluctuate with time, depending on the outcome of the underlying roulette wheel spins. Take, for example, the graph below of FIG. 5, which illustrates three of a veritably infinite number of outcomes or possibilities between $T_O$ (point in time at which the wager is placed) and $T_5$ (the time at which the bettor has either won or lost; or, in the alternative, the time at which the wager is no longer "live").

Figure 5:
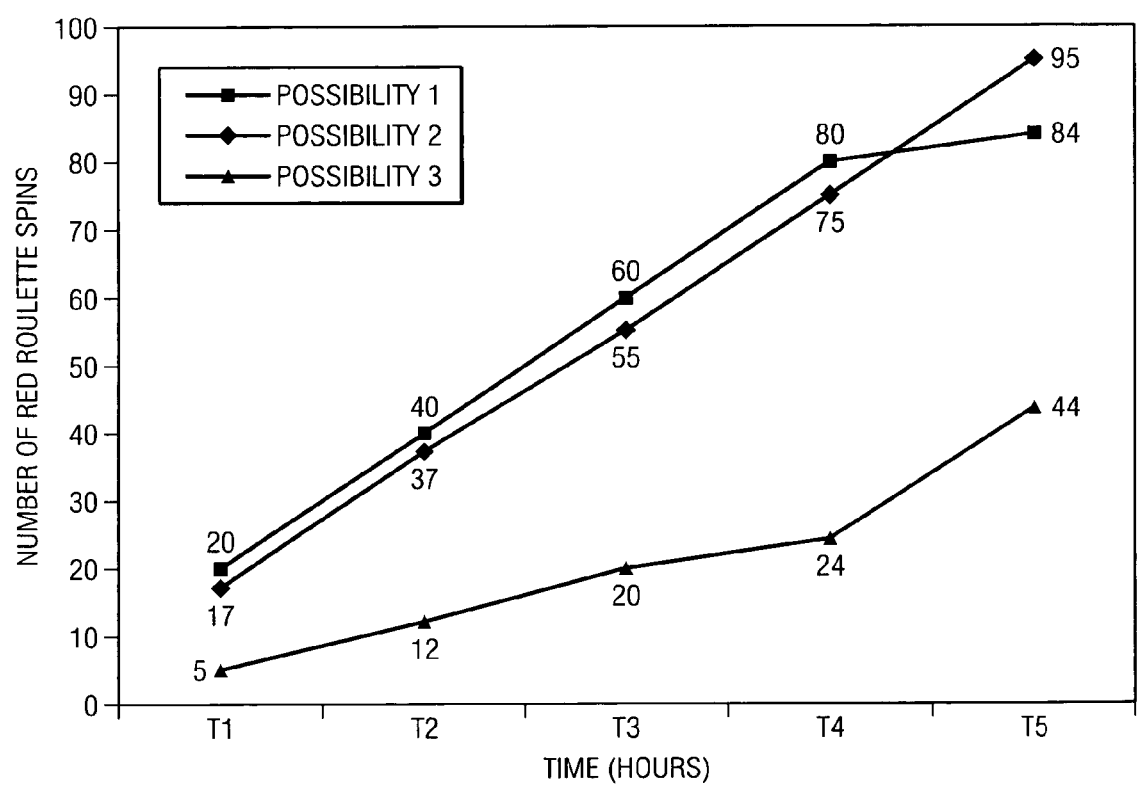
FIG. 5 depicts a graph of three potential outcomes that may arise during the course of one relevant wager (therein dealing with roulette spins).

In regards to the graph of FIG. 5, one may observe various potential outcomes and infer their "real-dollar" significance to users. Possibility 1 (which merely denotes some outcome $O_{MN} \epsilon O$), shows a timeline in which during the first, second, third, and fourth hours, 20 out of 20 roulette spins fall on red. At $T_4$, $U_1$ need only have 10 out of the 20 final spins land on red in order to win his wager. At $T_4$, $U_1$'s wager, made at $T_O$ for only $10, is arguably worth much more (especially to the extent that his wager "locked in" high odds, for instance, if his position in the outcome was defined such that occurrence of the outcome would yield a payment of $500), because statistically the odds are now in his favor (50%). Based on the exemplary odds and interim outcomes just described, it would be expected that at $T_4$, $U_1$ could find a buyer willing to pay around $250, at least, for the financial instrument 76 held by $U_1$, and the present invention provides for a ready market for such transactions. At $T_4$, $U_1$ may elect to either hold the financial instrument 76 or transfer it, as one would transfer a futures contract, an option, or any such derivative market instrument, to another user, $U_3$, willing to buy. Thus, without having a stake in the outcome of each individual spin of the roulette wheel, $U_1$ is able to invest in some probabilistic event 210 based on a series of roulette spins, and subsequently profit if he were to sell his financial instrument 76 at $T_4$ to a willing buyer. In the exemplary graph shown, between $T_4$ and $T_5$, Possibility 1 concludes unfavorably for the bettor in possession of $U_1$'s original wager because only 4 of the last 20 roulette spins result in red—the total being 84 red roulette spins over the relevant five-hour period. In such an instance, $U_1$ would have been well-advised to sell to $U_3$ at $T_4$ for, say, $250.

Similarly, Possibility 2 denotes another potential outcome within the set, O, of all possible outcomes. In Possibility 2, the period between $T_O$ & $T_4$ is not as promising for $U_1$ as Possibility 1 began. In Possibility 2, there have been 75 red roulette spins at $T_4$. This means that $U_1$ needs a total of at least 15 out of 20 (75%) roulette spins to come up red during the final hour. In this scenario, U1's original financial instrument 76 may be worth little more, if not less, than his original investment. The odds are statistically against him (75%>50%). He may, as before, sell (perhaps at a loss), trade, or hold his financial instrument 76. However, in the example given, between $T_4$ and $T_5$, 20 out of 20 roulette spins are red, providing a grand total of 95 red spins during the relevant five-hour period, and providing a win or payout to the holder of the financial instrument 76. As noted, while exaggerated numbers and statistical outcomes have been chosen for illustrative purposes, it is believed that even in "real world" play, wherein the occurrence of red and black spins over time will rarely be expected to skew heavily in favor of either color, the same principles of volatility over time, and the same investment-strategizing opportunities for the holder or potential purchaser of a financial instrument 76 prior to "maturity," will apply.

Lastly, Possibility 3 illustrates a potential outcome in which $U_1$'s financial instrument 76 is worthless within two hours. During the first hour ($T_1$), there are 5 red roulette spins. During the second hour ($T_2$), there are 7 red roulette spins. This yields a total of 12 out of the first 40 roulette spins as red. By $T_2$, it is impossible for a total of 90 red roulette spins to be reached through the remaining spins in the 100 spin duration.

Thus, the system creates novel financial instruments 76 and a market by which to facilitate the transfer of all such instruments 76. Individual clients 10 are able to hedge their wagers through various means, respond to market fluctuations accordingly, and freely exchange or transfer their financial instruments 76 in any manner they see fit.

Example Financial Instruments

In a particular embodiment of the system 5, financial instruments 76 may be grounded in the pull of slot machines. On each spin of the reels, a computer device may be used to record the placement of a symbol in relation to the "pay line" on each reel of each slot machine linked to system 5. For example, in conventional slot machines, the "pay line" may be represented by a horizontal bar across the middle of the reel display. Each position may be given a corresponding numerical value according to a point system. For example, a cherry on the pay line may represent 0, a cherry one line above the line may represent +1, and a cherry one line below the line may represent −1; an orange on the pay line may represent 3, an orange one line above the pay line may represent 5, and an orange one line below the pay line may represent 1; no symbol on the pay line could represent −3, no symbol one line above the pay line could represent −1, and no symbol one line below the line could be −5, etc. It should be noted that the point value assigned to each possible outcome (e.g., "−5" for no symbol one line below the pay line), could be arbitrarily chosen in the structuring of a particular proposition. In structuring the proposition for a particular instrument 76, the party practicing the present invention might commonly—but is not required to—take into account estimated "actual" odds of a particular outcome. E.g., the point value assigned to an orange in a particular position might (but need not) reflect relative distributions of oranges on the respective slot machine reels.

Because the present invention provides for free trading of financial instrument 76, though, it will be recognized that even random assignment of point values to various outcomes could be made, and an efficient market still created, because market participants would be free to evaluate if the point value for a particular outcome had been fixed "too low" or "too high" (in each case, vis a vis actual or perceived mathematical odds of such an outcome), and could increase (or decrease) the amount they were willing to pay for participation in a position whose success depended in whole or in part on such outcome.

Each individual slot machine may be linked to central controller 50, which records and maintains an ongoing tally of the outcomes of each event 210. The ongoing tally may be displayed throughout the facility (casino or other facility), as well as in other locations, such as on closed-circuit television in hotel rooms connected to the facility or on the Internet. Since the point will be changing in real time as the slot machines are used by patrons at the one or more locations, the display of the point may be updated in real time or at predetermined intervals. This updated display can provide price guidelines upon which market participants may value the instruments 76 and place transactions. Individuals may wager on whether the point will go higher or lower by either buying or selling the associated financial instrument 76. The value of the financial instrument 76 may be tied directly to the point itself and move in unison, up or down, with the point.

Trades of financial instruments 76 may be made in various places in the facility, including on the slot machine itself, at a kiosk or betting window, and at other locations, by using a prepaid ATM-type card, a smart card, or other card representing established credit. The present invention may also facilitate trading outside the facility, such as in casino hotel rooms, on the Internet, via telephone, or otherwise. ATM cards, smart cards, and other known methods for tracking the initiation and timing of an electronic transaction may be used to record and track a plurality of transactions for multiple players on a single point, or for a single player as to multiple positions on a plurality of points.

Data regarding the status of a point, and its trading history and value as between multiple clients 10, can be stored in memory 72 and displayed centrally (e.g., using a web server or central computer), with access to such information being available centrally (for, e.g., the house's purposes if the house is practicing the present invention) as well as to individual market participants (through, e.g., distributed terminals, over a virtual private network, or over secured (or unsecured) internet servers). Provision of data security and integrity for remote access to such information may be provided in accordance with known security and encryption protocols, such as, e.g., 128 bit SSL protection for secured Internet communications.

Multiple "points" may be created on a rolling basis. For instance, each new spin of a slot machine may be viewed as beginning a new point, and investors may take positions as to any (or several) of multiple points on a rolling basis. Computerized tracking of the points (and of associated financial instruments 76) can be readily provided using account management software and platforms. Because clients 10 need not be present in the facility while they have a position in a financial instrument 76, they can essentially be gambling on slot machines (or positions based upon outcome of slot machine transactions) anytime and from any location.

In various different embodiments according to the present invention, the point may run continuously 24-hours a day for unlimited duration, or instead it may have a pre-defined time limit after which time all outstanding financial instruments 76 are settled and a new point thereafter begins. For instance, a point ($point_{0day}$) could be established at noon, January 1, and another point ($point_{0week}$) established at the same time, with $point_{0day}$ having pre-fixed duration of 24 hours and $point_{0week}$ having pre-fixed duration of exactly one week. Thus a pre-defined "settlement date" would be known for each point. The settlement date for $point_{0day}$ would be noon, January 2, and the settlement date for $point_{0week}$ would be noon, January 8.

"Settlement" or "outcome" of a financial instrument 76 associated with a particular point could be defined in a number of user-customizable ways. Often it would be predefined. To take a simple example (based upon a position in which the value of a financial instrument 76 is defined by multiple spins of a roulette wheel, with "red" counting for −1, "black" +1, and "green" for 0), if the point were positive as of the settlement date, a holder of a "black" or long position in that point ($position_{long}$) would win a particular amount of money. In particular embodiments, the amounts won could be a pre-defined amount, such as an amount equal to an initial wager; an amount that varies according to particular odds that are set for the underlying event of the financial instrument 76; or an amount that varies according to a spread-bet. Because it is possible to structure both "short" and "long" positions, this simple exemplary position could also provide that if the point were negative as of the settlement date, the holder of the "long" position would lose his investment but a party who was "short" on the point would win based on such a negative point. "Positions" may be defined in a number of fashions—e.g., dollar-value units, shares, chips, or other units of proportional participation could be used to reflect the amount of money (or the proportional share in the position outcome or payoff) that a particular investor has in play.

The above paragraph assumes a binary form of point, with the "payoff" structured as, e.g., a 1:1 payoff, reflecting roughly equal statistical odds, for the "winning" and "losing" pointholder. Of course, it is also possible to structure "payoffs" for particular positions in points to reflect differential statistical odds. For instance, if a position ($position_{green+90}$) were structured wherein the point was defined as the number of "green" outcomes (i.e., "0"s or "00"s in American roulette) in a roulette game over a period of one day, the payoff could be structured to provide that if the point were greater than, e.g., 90 on the settlement date, the "long" player in that position would win fifty (50) times his initial position price, whereas if the point were less than, e.g., 90 at settlement, the long player would lose his initial investment in the position.

The present invention also is readily adaptable for use with "spread betting" concepts. In such an embodiment, based for instance on the simplest red/black-defined roulette point, a "long" investor who paid $X for his initial position as to $point_{0day}$ would receive incrementally greater (or, respectively, less) than $X in return as of the settlement date based upon the amount by which the point (as of settlement date) was greater (or, respectively, less) than the initial point value. Thus, the investors in positions can benefit (or lose) proportionately (up to either a predefined limit, or without limit) to the extent that actual point outcomes diverge from statistically-expectable "predicted" outcomes. Accordingly, at the time of settlement of the financial instrument 76, the "long" investor would receive a payoff of $X for each point above the initial point value at the time of settlement, or conversely would lose $X for each point below the initial point value at the time of settlement.

Financial instruments 76 may also be structured in accordance with the present invention wherein the "payoff" to a holder is not a pure "predetermined" set payoff, nor a pure "spread bet" payoff, but is partly or in whole a pari-mutuel payoff, wherein the holder as to a financial instrument 76 in a particular outcome is paid, partly or wholly, based upon a pro rata division of the total amount wagered upon the event or proposition and all its various outcomes, divided to reflect the number of position-holders who picked each respective position.

Additionally, further positions in a point can be predefined so as to allow an investor to benefit (or lose) from significant divergences from "predicted" point outcomes. Thus, in the simple roulette example in which the point is defined by total ratio of red to black outcomes (which may be expected a priori to be roughly 1:1), an additional position ($position_{0dayblack+150}$), could be defined based on the proposition that, as of the settlement date, there will have been 150 more black outcomes than red outcomes during the life of the point. "Payoff" on $position_{0dayblack+150}$ could be determined as a pre-determined value (e.g., a single payoff of $10 for each unit of participation in a long position in that point), or on a "spread betting" basis. If the "payoff" for a long position in $position_{0dayblack+150}$ is defined in terms of a fixed dollar or other value (for instance, $10 for each unit of participation in the position), then it can be expected that investors will discount accordingly the amount of money they would be willing, a priori, to pay for such position.

However, perceived value of a financial instrument 76 will very often change over time. To take the above example regarding a financial instrument 76 in $position_{0dayblack+150}$, if the payoff at settlement date were pre-fixed as $10 for each unit of participation, it could be expected that, at the very initiation of the point, investors would pay substantially less than $10 for a unit of $position_{0dayblack+150}$—based on their expectation that point0day would, at the settlement date, be well below +150 (where red outcomes increment the point by −1, and black outcomes by +1), i.e., close to 0. However, if twenty three (23) hours following initiation of $point_{0day}$, the instantaneous value of $point0$ were +175 (because blacks had exceeded reds by 175 outcomes during the life so far of $point_{0day}$), then investors would likely pay very close to $10 for a unit of $position_{0dayblack+150}$, believing that there was an excellent chance that when point$_{0day}$ closed in one further hour, point$_{0day}$ would still be over +150.

The present invention allows for ready trading in financial instruments 76, effectively in real time, over a platform or platforms. Investors could also join sub-groups for competitive trading or tracking of financial instruments 76, which sub-groups could be hosted as "communities" or "leagues," either by the house, by a centralized provider of services pursuant to the present invention, or through a variety of related or unrelated third-party hosting services. In this connection, even when the house or other provider or tracker of point values and position outcomes does not actually host all investors or players as to positions in points, the house or other provider could provide one or more of the following for use by remote players or leagues or communities of investors in positions: centralized statistical services, research services, historical position data, account hosting, and settlement services for trades in positions.

Current prices and other trading information, including results, can be posted on a website or stock ticker, and published in newspapers and broadcast on television and radio stations, so players not in the facility can follow the progress of their financial instruments 76. All of the methods that are commonly used for transmitting stock price data in real time or near real time may be used to transmit information regarding the current valuations of the financial instruments 76 created in accordance with the present invention.

In other embodiments of the present invention, trading and investing may be facilitated as to positions on a variety of casino games or other propositions wherein a player may seek to wager regarding the outcomes of particular events (or in which the player may gain or lose value in a proposition based on the nearness with which an actual outcome of a particular event matches the outcome as to whose occurrence the player took a position). Accordingly, the present invention could readily be adapted for trading positions on a rolling basis as to a large number of casino games (e.g., roulette, keno, craps, poker or other card games), as well as other propositions (e.g., outcomes of particular financial market events or values) wherein multiple participants may take positions as to groups of events having uncertain outcomes.

The present invention may therefore be used in accordance with countless types of wagers. These wagers may include, but are not limited to, straight "fixed odds" bets of any odds ratio, spread bets, fixed over/under bets, and range bets. The bets may be placed with respect to, for example, roulette results for a particular casino over some finite period of time, or even for several casinos combined.

In another exemplary embodiment of the present invention, a system and method may be employed for creating financial instruments 76 in connection with horse racing or other common sporting events that may have multiple participants, which are currently the subject of pari-mutuel or other wagering propositions but could also be made the subject of a tradable point-based wagering proposition. Financial instruments 76 may be employed in numerous ways to establish a particular position with respect to some aspect of the outcome of a series of horse races, and the positions embodied in those instruments 76 may be traded in the same way as any of the other instruments 76 discussed herein.

In one exemplary embodiment of a system and method according to the present invention, the horses in a given race may be divided into groups, most simply into two groups. The division into groups may be performed on a random mathematical basis, based upon active handicapping by the house as to the estimated respective skill levels and probability of winning the race for each horse in the group, or by any other method. In the example in which the horses in a single race are broken into two groups, the first group might be designated, e.g., the "+1" group, with the second group being designated the "−1" group. Thus, a point is created in which investors may take a position on either side. Because odds in horse racing typically fluctuate up until the moment the race begins, the financial instrument 76 could be traded, once bought, as the perceived odds of some or all of the horses in the given group rose or fell. In a multi-race embodiment, of course, opportunities for trading the financial instrument 76 over time would be even more extensive. There is no inherent limit to the number of races that can be combined (including races at remote locations), or the variety of ways in which horse groupings could be divided, in creating a rolling proposition wager embodied in a financial instrument 76 and tradable by participants.

The "win-lose"/payoff determination for the propositions that are made the subject of positions in the present invention could also be measured in a number of fashions. For example, the "winning" position on the point could correspond simply to that group of horses that contained the single winning horse in the relevant race(s); or could be defined as the group that contained the most horses that finished in the top three positions (win, place, and show) in the race(s), etc.

This aspect of the invention could also be employed for pure party-counter-party betting, in which the system serves solely as a market for matching individual investors who are willing to take diametrically opposed positions on a particular point, or to trade in such positions (with the house extracting a small service fee for its clearinghouse functions). The point-setting and position-selling mechanisms or options offered by the house could be varied in a wide variety of fashions to allow the house to be as "risk averse" or "risk tolerant" (i.e., having some or all of the house's own money actively in play and subject to unknown risk-based outcomes) as is desired.

In another exemplary embodiment of the present invention, a transferable financial instrument 76 may be created to embody yet another type of wager, the subject of which may be real financial markets. As an example, in one embodiment, the house may establish a point value based on the closing value of a particular stock or group of stocks, such as the Dow Jones Industrial Average (DJIA). A bettor may take a particular position relative to that point as to the closing value of the DJIA over a period of days, months, or years. The value of the bettor's associated financial instrument 76 will change with fluctuations in the DJIA and subsequent changes in the point value. That position, via its corresponding instrument 76, may be traded and transferred among clients 10. The value of that position will fluctuate in accordance with the fluctuations in the stocks listed on the DJIA—a payoff may be structured such that a holder of a financial instrument 76 embodying a "long" position will receive a payoff if the value of the DJIA is higher than the house's pre-set point value at the time of settlement. Moreover, if the financial instrument 76 embodies a point position that is favorable in relation to the house's set point position, the instrument 76 will presumably be of greater value than at the time it was purchased, and accordingly will command such higher value in trading, sale, or other transfer of the financial instrument 76 between individual bettors. Other embodiments may be employed within the scope of this invention to create derivative financial instruments 76 which are based on innumerable other aspects of financial markets worldwide.

As would be understood by one skilled in the art, the present invention is not limited to the types of financial instruments 76 discussed herein, but may be implemented in accordance with a large variety of casino games, sporting events, financial markets, or any other events having uncertain outcomes (e.g., the weather, election results, etc.).

Further, the present invention is compatible with a wide range of computerized implementations, in particular with systems in which financial instrument 76 may be traded electronically over the internet or World-Wide-Web (or in conjunction with telephone call centers in which telephone operators or computerized Interactive Voice Response Units (IVRUs) perform computerized input of client-supplied information) so that global and round-the-clock real-time access to the betting market is made possible in appropriately-secured form.

Those of ordinary skill in the art will appreciate that the foregoing discussion of certain embodiments and preferred embodiments is illustrative only, and does not limit the spirit and scope of the present invention, which are limited only by the claims set forth below.

What is claimed is:

1. A method comprising,
receiving by a computing system from a computing device in use by a user a wager that comprises a plurality of bets including at least a first bet and a second bet:
wherein the first bet comprises one of:
a bet that a value of a first financial market indicator will be up at an end of a first predetermined period of time as compared to the value of the first financial market indicator at a beginning of the first predetermined period of time, and
a bet that the value of the first financial market indicator will be down at the end of the first predetermined period of time as compared to the value of the first financial market indicator at the beginning of the first predetermined period of time; and
wherein the second bet comprises one of:
a bet that a value of a second financial market indicator will be up at an end of a second predetermined period of time as compared to the value of the second financial market indicator at a beginning of the second predetermined period of time, and
a bet that the value of the second financial market indicator will be down at the end of the second predetermined period of time as compared to the value of the second financial market indicator at the beginning of the second predetermined period of time, and
wherein the computing system and computing device are communicatively coupled via a communications network;
determining by the computing system at least one of:
an outcome of the first bet based at least in part on whether the value of the first financial market indicator is up, is down, or is unchanged at the end of the first predetermined period of time, and
an outcome of the second bet based at least in part on whether the value of the second financial market indicator is up, is down, or is unchanged at the end of the second predetermined period of time;
determining by the computing system an outcome of the wager based at least in part on at least one of:
the outcome of the first bet, and
the outcome of the second bet; and
communicating by the computing system the outcome of the wager to the user via the computing device;
wherein determining at least one of the outcome of the first bet and the outcome of the second bet comprises determining that at least one of the outcome of the first bet and the outcome of the second bet is a win;
wherein determining the outcome of the wager comprises determining that the outcome of the wager is a win based at least in part on determining that at least one of the outcome of the first bet and the outcome of the second bet is a win; and
wherein the method further comprises:
based at least in part on determining that the outcome of the wager is a win, determining by the computing system a payout, wherein an amount of the payout is greater when the outcome of the first bet and the outcome of the second bet are wins than when only one of the outcome of the first bet and the outcome of the second bet is a win.

2. The method of claim 1,
wherein determining that at least one of the outcome of the first bet and the outcome of the second bet is a win comprises determining:
that the value of the first financial market indicator moved, by the end of the first predetermined period of time, in a same direction to that of the first bet and that the outcome of the first bet is thereby a win, and
that the value of the second financial market indicator moved, by the end of the second predetermined period of time, in a same direction to that of the second bet and that the outcome of the second bet is thereby a win; and
wherein determining that the outcome of the wager is a win comprises determining that the outcome of the wager is a win based at least in part on determining that the outcome of the first bet is a win and the that outcome of the second bet is a win.

3. The method of claim 1, wherein the first financial market indicator and the second financial market indicator each comprises an index associated with at least one of:
the Dow Jones Industrial Average;
the NASDAQ;
the Financial Times Stock Exchange;
the S&P 500; and
the New York Stock Exchange.

4. The method of claim 1, wherein the user specifies at least one of the first predetermined period of time and the second predetermined period of time.

5. The method of claim 1, wherein the first predetermined period of time and the second predetermined period of time are the same period of time.

6. The method of claim 1, wherein the user specifies at least one of the first financial market indicator and the second financial market indicator.

7. The method of claim 1, wherein the wager further comprises at least a third bet, wherein the third bet comprises one of:
a bet that a value of a third financial market indicator will be up at an end of a third predetermined period of time as compared to the value of the third financial market indicator at a beginning of the third predetermined period of time, and
a bet that the value of the third financial market indicator will be down at the end of the third predetermined period of time as compared to the value of the third financial market indicator at the beginning of the third predetermined period of time.

8. The method of claim 7, wherein determining the payout comprises determining the payout based at least in part on a number of at least the first bet, the second bet, and the third bet that are determined to be a win.

9. The method of claim 7, wherein:
the first financial market indicator and the second financial market indicator are different indicators;
the first financial market indicator and the third financial market indicator are the same indicator; and
the first period of time and the third period of time are different periods of time.

10. The method of claim 1, further comprising:
establishing a financial instrument embodying at least the wager, the financial instrument comprising a price that is based at least in part on a point count that varies according to at least one of the outcomes of the first and second bets; and
facilitating a transfer of the financial instrument for an established price.

11. The method of claim 1, wherein each of the first financial market indicator and the second financial market indicator comprises at least one of:
a financial market index,
a financial market security, and
a financial market instrument.

12. The method of claim 1, wherein:
the first financial market indicator and the second financial market indicator are the same indicator; and
the first period of time and the second period of time are different periods of time.

13. The method of claim 1, wherein the first financial market indicator and the second financial market indicator are different indicators.

14. The method of claim 1, wherein the first period of time and the second period of time are different periods of time.

15. An apparatus, comprising:
at least one processor; and
at least one memory device electronically coupled to the at least one processor, in which the at least one memory device stores instructions which, when executed by the at least one processor, direct the at least one processor to:
receive a wager from a computing device in use by a user, wherein the wager comprises a plurality of bets including at least a first bet and a second bet:
wherein the first bet comprises one of:
a bet that a value of a first financial market indicator will be up at an end of a first predetermined period of time as compared to the value of the first financial market indicator at a beginning of the first predetermined period of time, and
a bet that the value of the first financial market indicator will be down at the end of the first predetermined period of time as compared to the value of the first financial market indicator at the beginning of the first predetermined period of time; and
wherein the second bet comprises one of:
a bet that a value of a second financial market indicator will be up at an end of a second predetermined period of time as compared to the value of the second financial market indicator at a beginning of the second predetermined period of time, and
a bet that the value of the second financial market indicator will be down at the end of the second predetermined period of time as compared to the value of the second financial market indicator at the beginning of the second predetermined period of time;
determine at least one of:
an outcome of the first bet based at least in part on whether the value of the first financial market indicator is up, is down, or is unchanged at the end of the first predetermined period of time, and
an outcome of the second bet based at least in part on whether the value of the second financial market indicator is up, is down, or is unchanged at the end of the second predetermined period of time;
determine an outcome of the wager based at least in part on at least one of:
the outcome of the first bet, and
the outcome of the second bet; and
communicate the outcome of the wager to the user via the computing device;
wherein to determine at least one of the outcome of the first bet and the outcome of the second bet comprises to determine that at least one of the outcome of the first bet and the outcome of the second bet is a win;
wherein to determine the outcome of the wager comprises to determine that the outcome of the wager is a win based at least in part on determining that at least one of the outcome of the first bet and the outcome of the second bet is a win; and
wherein the instructions, when executed by the at least one processor, further direct the at least one processor to:
based at least in part on determining that the outcome of the wager is a win, determine a payout, wherein an amount of the payout is greater when the outcome of the first bet and the outcome of the second bet are wins than when only one of the outcome of the first bet and the outcome of the second bet is a win.

16. The apparatus of claim 15, wherein each of the first financial market indicator and the second financial market indicator comprises at least one of:
a financial market index,
a financial market security, and
a financial market instrument.

17. The apparatus of claim 15,
wherein to determine that at least one of the outcome of the first bet and the outcome of the second bet is a win comprises to determine:
that the value of the first financial market indicator moved, by the end of the first predetermined period of time, in a same direction to that of the first bet and that the outcome of the first bet is thereby a win, and
that the value of the second financial market indicator moved, by the end of the second predetermined period of time, in a same direction to that of the second bet and that the outcome of the second bet is thereby a win; and
wherein to determine that the outcome of the wager is a win comprises to determine that the outcome of the wager is a win based at least in part on determining that the outcome of the first bet is a win and that the outcome of the second bet is a win.

18. The apparatus of claim 15, wherein the first financial market indicator is associated with at least one of:
the Dow Jones Industrial Average;
the NASDAQ;
the Financial Times Stock Exchange;
the S&P 500; and
the New York Stock Exchange.

19. The apparatus of claim 15, wherein the user specifies at least one of the first predetermined period of time and the second predetermined period of time.

20. The apparatus of claim 15, wherein the first predetermined period of time is the same as the second predetermined period of time.

21. The apparatus of claim 15, wherein the user specifies at least one of the first financial market indicator and the second financial market indicator.

22. The apparatus of claim 15, wherein the wager further comprises a third bet, wherein the third bet comprises one of:
- a bet that a value of a third financial market indicator will be up at an end of a third predetermined period of time as compared to the value of the third financial market indicator at a beginning of the third predetermined period of time, and
- a bet that the value of the third financial market indicator will be down at the end of the third predetermined period of time as compared to the value of the third financial market indicator at the beginning of the third predetermined period of time.

23. The apparatus of claim 22, wherein to determine the payout comprises to determine the payout based at least in part on a number of the first bet, the second bet, and the third bet that are determined to be a win.

24. The apparatus of claim 22, wherein:
- the first financial market indicator and the second financial market indicator are different indicators;
- the first financial market indicator and the third financial market indicator are the same indicator; and
- the first period of time and the third period of time are different periods of time.

25. The apparatus of claim 15, wherein the instructions, when executed by the at least one processor, further direct the at least one processor to:
- establish a financial instrument embodying at least the wager, the financial instrument comprising a price that is based at least in part on a point count that varies according to the outcomes of at least a portion of the plurality of bets; and
- facilitate a transfer of the financial instrument for an established price.

26. The apparatus of claim 15, wherein the first financial market indicator and the second financial market indicator are different indicators.

27. The apparatus of claim 15, wherein the first period of time and the second period of time are different periods of time.

28. The apparatus of claim 15, wherein:
- the first financial market indicator and the second financial market indicator are the same indicator; and
- the first period of time and the second period of time are different periods of time.

* * * * *